(12) United States Patent
Choi et al.

(10) Patent No.: US 12,353,627 B2
(45) Date of Patent: Jul. 8, 2025

(54) HEAD-WEARABLE ELECTRONIC, METHOD, AND NON-TRANSITORY COMPUTER READABLE STORAGE MEDIUM FOR EXECUTING FUNCTION BASED ON IDENTIFICATION OF CONTACT POINT AND GAZE POINT

(71) Applicant: Samsung Electronics Co., Ltd., Suwon-si (KR)

(72) Inventors: Sungsoo Choi, Suwon-si (KR); Donghyun Yeom, Suwon-si (KR); Beomsu Kim, Suwon-si (KR); Sungoh Kim, Suwon-si (KR); Jihyun Kim, Suwon-si (KR); Sunggeun Ahn, Suwon-si (KR); Gunhee Lee, Suwon-si (KR); Sanghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/429,918

(22) Filed: Feb. 1, 2024

(65) Prior Publication Data

US 2024/0329742 A1    Oct. 3, 2024

Related U.S. Application Data

(63) Continuation of application No. PCT/KR2024/000872, filed on Jan. 17, 2024.

(30) Foreign Application Priority Data

Mar. 28, 2023  (KR) .................. 10-2023-0040595
May 16, 2023   (KR) .................. 10-2023-0063203

(51) Int. Cl.
*G06F 3/0488*    (2022.01)
*G06F 3/01*      (2006.01)
(Continued)

(52) U.S. Cl.
CPC .............. *G06F 3/016* (2013.01); *G06F 3/013* (2013.01); *G06F 3/0488* (2013.01);
(Continued)

(58) Field of Classification Search
CPC ........ G06F 3/013; G06F 3/016; G06F 3/0488; G06F 3/011; G06F 3/04883; G06T 11/001; G06T 2200/24
See application file for complete search history.

(56) References Cited

U.S. PATENT DOCUMENTS

| 9,696,855 B2 | 7/2017 | Watanabe |
| 9,958,941 B2 | 5/2018 | Gustafsson |

(Continued)

FOREIGN PATENT DOCUMENTS

| CN | 112363616 A | 2/2021 |
| KR | 2016-0111904 A | 9/2016 |

(Continued)

OTHER PUBLICATIONS

International Search Report dated Apr. 30, 2024 for PCT/KR2024/000872.
PCT Written Opinion dated Apr. 30, 2024 for PCT/KR2024/000872.

*Primary Examiner* — Adam J Snyder
(74) *Attorney, Agent, or Firm* — Nixon & Vanderhye P.C.

(57) ABSTRACT

According to an embodiment, a wearable device may display, based on contact on a second surface identified using a touch sensor, a visual object indicating a first position of the touch input on the second surface in a screen through a display. The wearable device may identify, in response to the touch input, a second position in the screen of a gaze identified based on an image obtained through a camera exposed outside at a portion of a first surface. The wearable device may provide, in response to the second position identified within a specified distance from the first position of the visual object, feedback with respect to the touch input.

(Continued)

The wearable device may cease to provide the feedback in response to the second position identified outside from the first position by the specified distance.

20 Claims, 15 Drawing Sheets

(51) Int. Cl.
  *G06T 11/00*  (2006.01)
  *G06F 3/04883*  (2022.01)
(52) U.S. Cl.
  CPC ............ *G06T 11/001* (2013.01); *G06F 3/011* (2013.01); *G06F 3/04883* (2013.01); *G06T 2200/24* (2013.01)

(56) References Cited

U.S. PATENT DOCUMENTS

| | | | |
|---|---|---|---|
| 9,971,401 | B2 | 5/2018 | Stafford |
| 10,101,803 | B2 | 10/2018 | Faaborg |
| 10,134,189 | B2 | 11/2018 | Yamamoto et al. |
| 10,606,344 | B2 | 3/2020 | Faaborg |
| 10,754,496 | B2 | 8/2020 | Kiemele |
| 11,181,744 | B2 | 11/2021 | Kang |
| 2013/0335321 | A1 | 12/2013 | Sugita et al. |
| 2016/0109947 | A1* | 4/2016 | George-Svahn ........ G06F 1/169 345/156 |
| 2017/0364198 | A1* | 12/2017 | Yoganandan ....... G06F 3/04815 |
| 2018/0275764 | A1* | 9/2018 | Lee ........................ G06F 3/0482 |
| 2019/0056861 | A1 | 2/2019 | Kim et al. |
| 2019/0392647 | A1 | 12/2019 | Lee |
| 2020/0275089 | A1* | 8/2020 | Lee ......................... G06F 3/017 |
| 2022/0124239 | A1 | 4/2022 | Kakizaki |

FOREIGN PATENT DOCUMENTS

| | | |
|---|---|---|
| WO | WO2021131023 A1 | 7/2021 |
| WO | WO2022258348 A1 | 12/2022 |

* cited by examiner

HEAD-WEARABLE ELECTRONIC, METHOD, AND NON-TRANSITORY COMPUTER READABLE STORAGE MEDIUM FOR EXECUTING FUNCTION BASED ON IDENTIFICATION OF CONTACT POINT AND GAZE POINT

CROSS-REFERENCE TO RELATED APPLICATIONS

This application is a continuation of International Application No. PCT/KR2024/000872 designating the United States, filed on Jan. 17, 2024, in the Korean Intellectual Property Receiving Office and claiming priority to Korean Patent Application Nos. 10-2023-0040595, filed on Mar. 28, 2023, and 10-2023-0063203, filed on May 16, 2023, in the Korean Intellectual Property Office, the disclosures of each of which are incorporated by reference herein in their entireties.

BACKGROUND

Field

The present disclosure relates to a wearable device for providing feedback on touch input and method thereof.

SUMMARY

According to an example embodiment, a wearable device, may comprise: a housing, at least one processor comprising processing circuitry, a display positioned on a first surface of the housing, a camera exposed outside at a portion of the first surface, a touch sensor configured to identify contact on a second surface opposite to the first surface. At least one processor may be configured to display, based on contact on the second surface identified using the touch sensor, a visual object indicating a first position of the touch input on the second surface in a screen through the display. At least one processor may be configured to identify, in response to the touch input, a second position in the screen of a gaze identified based on an image obtained through the camera. At least one processor may be configured to provide, in response to the second position identified within a specified distance from the first position of the visual object, feedback with respect to the touch input. At least one processor may be configured to cease to provide the feedback in response to the second position identified outside from the first position by the specified distance.

According to an example embodiment, a method of a wearable device may comprise displaying, in a screen through a display positioned on a first surface of a housing, a visual object indicating a first position of a touch input on a second surface opposite to the first surface. The method may comprise identifying, in response to the touch input, a second position in the screen of a gaze identified based on an image obtained through a camera. The method may comprise providing, in response to the second position identified within a specified distance from the first position of the visual object, feedback with respect to the touch input. The method may comprise ceasing to provide the feedback in response to the second position identified outside from the first position by the specified distance.

According to an example embodiment, a non-transitory computer-readable storage medium storing one or more programs, wherein the one or more programs, when executed by at least one processor of a wearable device, may cause the wearable device to display, in a screen, through a display positioned on a first surface of a housing, a visual object indicating a first position of a touch input on a second surface opposite to the first surface. The one or more programs, when executed by at least one processor of the wearable device, may cause the wearable device to identify, in response to the touch input, a second position in the screen of a gaze identified based on an image obtained through a camera. The one or more programs, when executed by at least one processor of the wearable device, may cause the wearable device to provide, in response to the second position identified within a specified distance from the first position of the visual object, feedback with respect to the touch input. The one or more programs, when executed by at least one processor may cause the wearable device to cease to provide the feedback in response to the second position identified outside from the first position by the specified distance.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
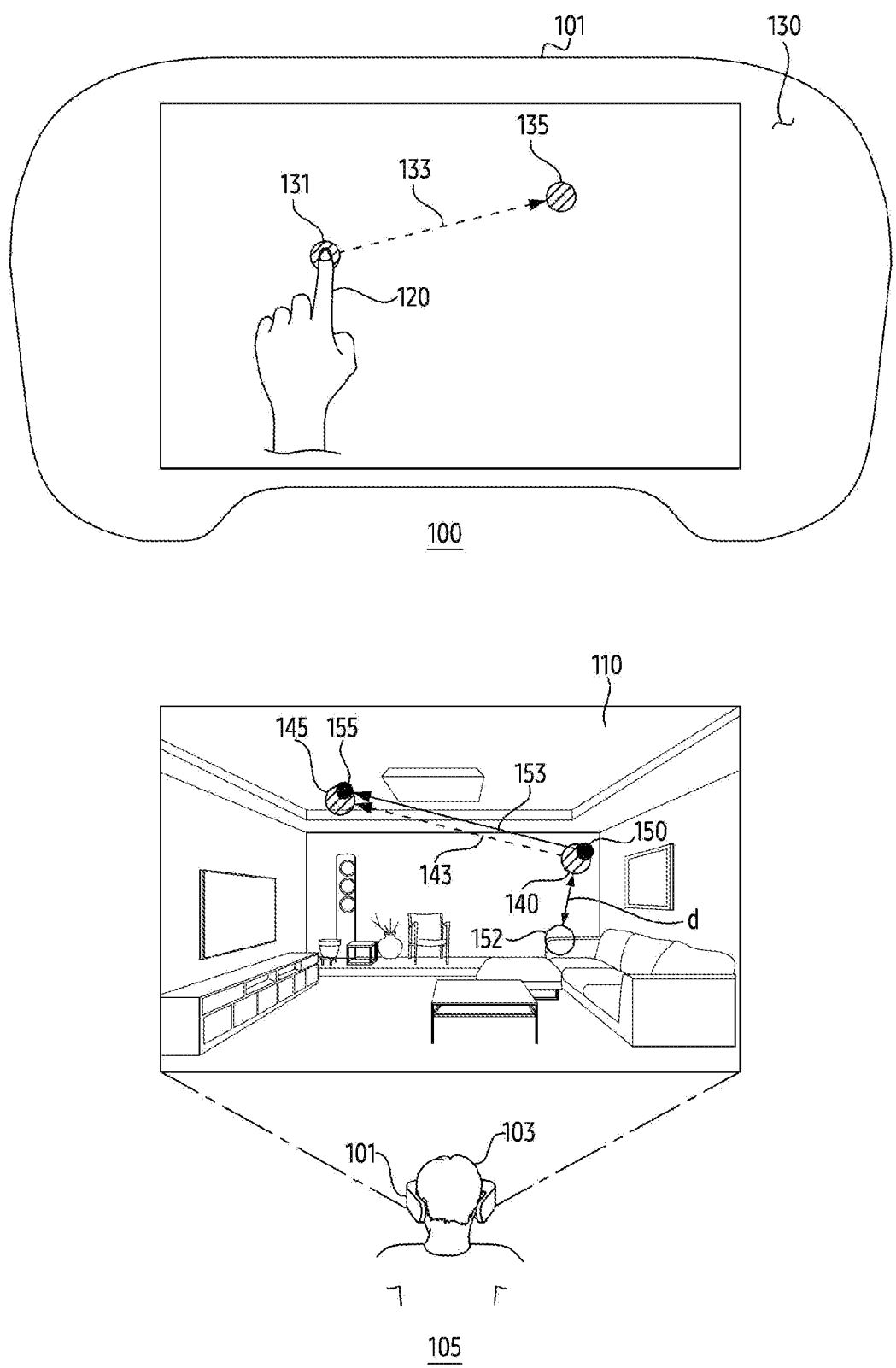
FIG. 1 is a diagram illustrating an example of a wearable device that recognizes a touch input on a wearable device according to an embodiment.

Hereinafter, various example embodiments of the present disclosure will be described in greater detail with reference to the accompanying drawings.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a diagram illustrating an example of a wearable device that recognizes a touch input on a wearable device according to an embodiment. Referring to FIG. 1, a wearable device 101 according to an embodiment may include a head-mounted display (HMD) that is wearable on the head of a user 103. Although the outer appearance of the wearable device 101 in the form of glasses is illustrated, the disclosure is not limited thereto. An example of the structure of the wearable device 101 that may be worn on the head of the user 103 is described in greater detail below with reference to FIGS. 7A, 7B and/or 8A and 8B. One or more hardware components included in the wearable device 101 is described with reference to FIG. 2.

According to an embodiment, the wearable device 101 (e.g., a wearable device 700 of FIGS. 7A to 7B and/or a wearable device 800 of FIGS. 8A to 8B) may execute functions associated with augmented reality (AR) and/or mixed reality (MR). Referring to FIG. 1, within the state where the user is wearing the wearable device 101, the wearable device 101 may include at least one lens (e.g., lens 730 of FIG. 7B) positioned adjacent to the eyes of the user. The wearable device 101 may combine ambient light passing through the lens with light emitted from a display (e.g., a display 230 of FIG. 2) of the wearable device 101. The display area of the display may be formed within a lens through which the ambient light passes. Since the wearable device 101 combines the ambient light and the light emitted from the display, the user 103 may see an image that is a mixture of a real object recognized by the ambient light and a virtual object formed by the light emitted from the display.

According to an embodiment, the wearable device 101 may execute a function associated with video see-through (VST) and/or virtual reality (VR). Referring to FIG. 1, within the state where the user is wearing the wearable device 101, the wearable device 101 may include a housing that covers the eyes of the user 103. Within the state, the wearable device 101 may include a display (e.g., a first display 750-1 and/or a second display 750-2 of FIG. 8A) positioned on a first surface (e.g., a first surface 810 of FIG. 8A) facing the eye. The wearable device 101 may include a camera (e.g., cameras 840-5, 840-6, 840-7, 840-8, 840-9, and 840-10 of FIG. 8B) positioned on the second surface (e.g., a second surface 820 of FIG. 8B) opposite to the first surface. Using the camera, the wearable device 101 may obtain frames including the ambient light. The wearable device 101 may make the user recognize the ambient light through the display, by outputting the frames in the display positioned on the first surface. The display area of the display positioned on the first surface may be formed by one or more pixels included in the display. The wearable device 101 may make the user recognize the virtual object together with the real object recognized by the ambient light, by synthesizing the virtual object in frames output through the display.

Referring to FIG. 1, according to an embodiment, the wearable device 101 may display a screen 110 through the display positioned on the first surface of the housing. For example, the screen 110 may include a screen representing the surrounding environment of the wearable device 101, based on an image obtained through the first camera exposed through a portion of a second surface 130 opposite to the first surface. For example, the screen 110 may include a screen representing the virtual reality.

Referring to a first example 100 and a second example 105, according to an embodiment, the wearable device 101 may identify contact of an external object 120 on the second surface 130 while displaying the screen 110. For example, the wearable device 101 may display a first visual object 140 indicating the contacted first position on the screen 110, based on the contact of the external object 120 on the second surface 130. For example, the first visual object 140 may be referred to as a pointer. For example, the first visual object 140 may be represented as a preset shape (e.g., circle, triangle, quadrangle, pentagon, hexagon, octagon, and/or arrow). For example, the first visual object 140 may be represented in a form in which the preset shape is filled with a preset color. For example, the wearable device 101 may identify a contact point of the external object 120 on the second surface 130. For example, the wearable device 101 may identify a touch input at a first position 131 on the second surface 130. The wearable device 101 may identify the movement of the external object 120. The wearable device 101 may identify a movement path 133 of the external object 120. For example, the wearable device 101 may identify a second position 135 at which the movement of the external object 120 is completed. The wearable device 101 may display a first visual object 145 indicating the external object 120 identified at the second position 135 through the display. For example, the wearable device 101 may move the first visual object 140 based on a movement path 143, based on the movement path 133 of the external object 120.

Figure 2:
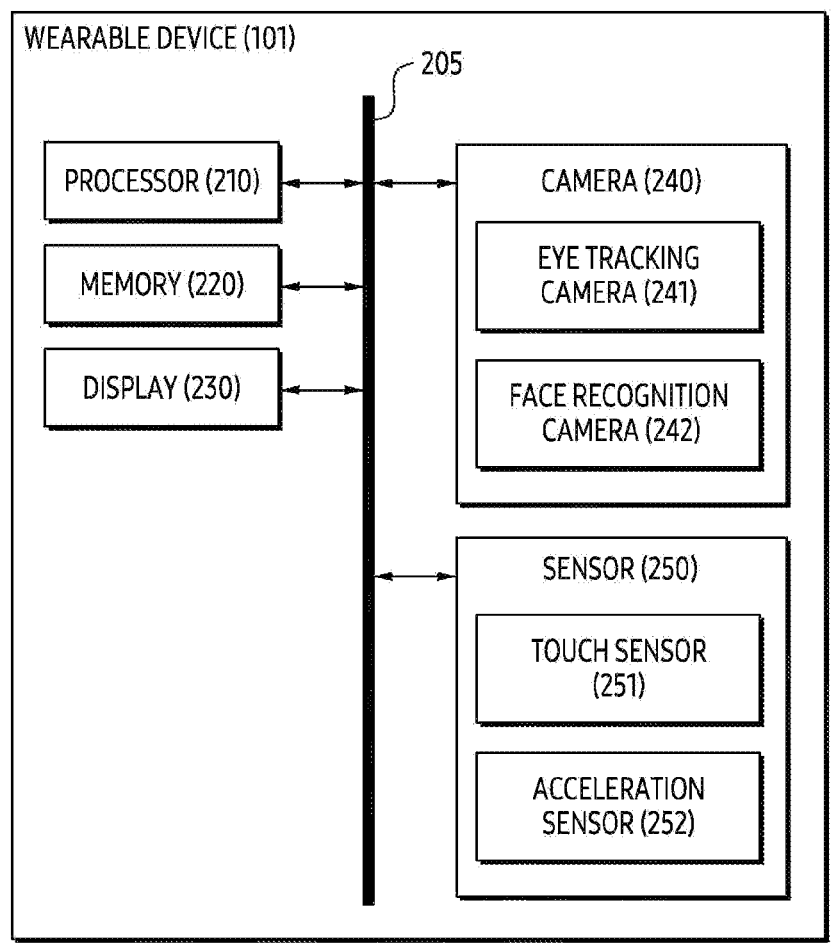
FIG. 2 is a block diagram illustrating an example configuration of a wearable device according to an embodiment.

According to an embodiment, the wearable device 101 may track the gaze of the user 103 through a second camera (e.g., an eye tracking camera (ET CAM) 241 of FIG. 2) exposed through a portion of the first surface where the display is positioned. For example, the second camera may include the eye tracking camera and/or a face recognition camera (e.g., a face recognition camera 242 of FIG. 2). The wearable device 101 may identify a third position within the screen 110 of the gaze of the user 103 based on the image obtained through the second camera. Based on identifying the third position, the wearable device 101 may display a second visual object 150 for indicating the third position associated with the gaze within the screen 110. For example, the position of the second visual object 150 within the screen 110 may correspond to the third position within the screen 110 identified by the wearable device 101.

According to an embodiment, the wearable device 101 may identify a distance between the first visual object 140 displayed based on the position (e.g., the first position) of the external object 120 contacted on the second surface 130 and the second visual object 150 displayed based on the position (e.g., the third position) of the gaze of the user 103. The wearable device 101 may identify whether the touch input identified at the contact point is valid, by comparing the distance between the position of the external object 120 contacted on the second surface 130 and the position of the gaze of the user 103 with a preset distance (or a reference distance) d. The distance may include the distance between the first visual object 140 indicating the position of the external object 120 and the second visual object 150 indicating the position of the gaze within the screen 110. The wearable device 101 may provide feedback with respect to the touch input in response to identifying the valid touch input.

According to an embodiment, the wearable device 101 may, in response to the touch input, identify the third position within the screen of the gaze of the user identified based on the image obtained through the second camera. The wearable device 101 may provide the feedback with respect to the touch input, in response to the third position identified within the preset distance d from the position (e.g., a position in the screen 110 of the first visual object 140) in the screen 110 corresponding to the touch input. For example, the wearable device 101 may provide the feedback with respect to the touch input without displaying the second visual object 150. For example, the wearable device 101 may cease to provide the feedback with respect to the touch input in response to the third position (e.g., a position in the screen 110 of the third visual object 152) identified outside the preset distance d from a position within the screen 110 corresponding to the touch input indicated by the first visual object 140. For example, the wearable device 101 may refrain from providing the feedback, in response to the third position identified outside the preset distance d from the position within the screen 110 corresponding to the touch input. The operations may be referred to as low-level touch based registration.

According to an embodiment, the wearable device 101 may display the second visual object 150 at the third position based on identifying the third position within the screen 110 of the gaze of the user 103. For example, the second visual object 150 may be displayed in a different size from the first visual object 140. For example, the second visual object 150 may be displayed in a different color from the first visual object 140. The wearable device 101 may identify the movement of the gaze of the user 103 based on the image obtained through the second camera. The wearable device 101 may display a second visual object 155 to which the second visual object 150 has moved based on a movement path 153 corresponding to the movement of the gaze of the user 103. For example, the wearable device 101 may display the second visual object 155 at a fourth position.

According to an embodiment, the wearable device 101 may identify whether the touch input is valid based on the movement path 153 of the gaze of the user 103 corresponding to the movement path 133 of the touch input. For example, the wearable device 101 may identify that the position of the touch input indicated by the first visual object 140 and the position of the gaze indicated by the second visual object 150 overlap. The wearable device 101 may identify that the touch input at the first position is valid, based on the overlapping of the position of the touch input and the position of the gaze in a preset duration. The wearable device 101 may provide the feedback with respect to the touch input, based on identifying the validity of the touch input.

According to an embodiment, the wearable device 101 may identify the similarity between the movement path 133 of the touch input and the movement path 153 of the gaze of the user. For example, the wearable device 101 may identify a direction of the movement path 133 of the touch input and the movement path 153 of the gaze of the user. For example, the wearable device 101 may identify the first direction from the first position to the second position. For example, the first direction may be associated with a direction in which the first visual object 140 moves within the screen 110. For example, the wearable device 101 may identify the second direction from the third position to the fourth position. For example, the second direction may be identified based on the movement of the gaze of the user. The wearable device 101 may move the second visual object 150 based on the movement of the gaze, within the screen 110. For example, the wearable device 101 may identify that the first position indicated by the first visual object 140 and the third position indicated by the second visual object 150 overlap, and may identify that the second position and the fourth position overlap. The wearable device 101 may identify that a touch input (or touch gesture) moved from the first position to the second position is valid in response to identifying the overlap. The wearable device 101 may provide the feedback with respect to the touch input (or the touch gesture) based on that the touch input (or the touch gesture) is valid.

As described above, according to an embodiment, the wearable device 101 may identify that the position and/or path of the touch input (e.g., the position and/or path of the first visual object 140 in the screen 110) and the position and/or path of the gaze of the user 103 at least partially match. The wearable device 101 may provide the feedback with respect to the touch input, based on matching the position of the touch input and the gaze of the user 103. The wearable device 101 may provide the feedback with respect to the touch input desired by the user 103 of the wearable device 101, by providing the feedback with respect to the touch input based on matching the touch input and the gaze of the user 103.

FIG. 2 is a block diagram illustrating an example configuration of a wearable device according to an embodiment. A wearable device 101 of FIG. 2 may include the wearable device 101 of FIG. 1.

Referring to FIG. 2, according to an embodiment, the wearable device 101 may include at least one of a processor (e.g., including processing circuitry) 210, a memory 220, a display 230, a camera 240, and/or a sensor 250. The processor 210, the memory 220, the display 230, the camera 240, and the sensor 250 may be electronically and/or operably coupled with each other by an electrical component such as a communication bus 205. Hereinafter, an operative coupling of hardware may refer, for example, to a direct or indirect connection between the hardware being established wired or wirelessly so that the second hardware is controlled by the first hardware of the hardware. Although illustrated in different blocks, the embodiment is not limited thereto. Some of the hardware of FIG. 2 may be included in a single integrated circuit, such as a system on a chip (SoC). The type and/or number of hardware included in the wearable device 101 is not limited to those illustrated in FIG. 2. For example, the wearable device 101 may include only some of the hardware illustrated in FIG. 2.

According to an embodiment, the wearable device 101 may include hardware for processing data based on one or more instructions. The hardware for processing data may include at least one processor 210, and the at least one processor 210 may include various processing circuitry. For example, as used herein, including the claims, the term "processor" may include various processing circuitry, including at least one processor, wherein one or more of at least one processor may be configured to perform various functions described herein. Additionally, the at least one processor may include a combination of processors performing various of the recited/disclosed functions. At least one processor may execute program instructions to achieve or perform various functions. For example, the hardware for processing data may include an arithmetic and logic unit (ALU), a floating point unit (FPU), a field programmable gate array (FPGA), a central processing unit (CPU), and/or an application processor (AP). The processor 210 may have a structure of a single-core processor, or may have a structure of a multi-core processor such as a dual core, a quad core, a hexa core, or an octa core. For example, the wearable device 101 may include the processor 210 within a housing.

According to an embodiment, the memory 220 of the wearable device 101 may include a hardware component for storing data and/or instructions that are input and/or output to the processor 210 of the wearable device 101. For example, the memory 220 may include volatile memory, such as random-access memory (RAM), and/or non-volatile memory, such as read-only memory (ROM). For example, the volatile memory may include at least one of dynamic RAM (DRAM), static RAM (SRAM), Cache RAM, and pseudo SRAM (PSRAM). For example, the non-volatile memory may include at least one of programmable ROM (PROM), erasable PROM (EPROM), electrically erasable PROM (EEPROM), flash memory, hard disk, compact disk, solid state drive (SSD), and embedded multi-media card (eMMC). For example, the wearable device 101 may store biometric data (or information) of the user, in the memory 220. For example, the wearable device 101 may store registration information in the memory 220. For example, the registration information may be associated with the biometric data of the user and/or touch input (or touch gesture). For example, the wearable device 101 may identify whether the touch input and the biometric data of the user match the registration information based on identifying an event. For example, when the touch input and the biometric data match the registration information, the wearable device 101 may execute a function corresponding to the event. For example, when the touch input and the biometric data do not match the registration information, the wearable device 101 may cease to execute the function corresponding to the event or may bypass. For example, in case that the touch input and the biometric data do not match the registration information, the wearable device 101 may refrain from executing the function corresponding to the event.

According to an embodiment, the display 230 of the wearable device 101 may output visualized information to the user. For example, the display 230 may output visualized information to the user, by being controlled by the processor 210 including a circuit such as a graphic processing unit (GPU). The display 230 may include, for example, and without limitation, a flat panel display (FPD) and/or electronic paper. The FPD may include, for example, and without limitation, a liquid crystal display (LCD), a plasma display panel (PDP), and/or one or more light emitting diodes (LED). The LED may include an organic LED (OLED). For example, the display 230 may be positioned on a first surface of the housing of the wearable device 101. For example, the first surface may face a direction facing the user, in the state where the user is wearing the wearable device 101.

According to an embodiment, the camera 240 of the wearable device 101 may include a lens assembly, a flash, or an image sensor. The lens assembly may collect light emitted from a subject which is a target of image capturing. The lens assembly may include one or more lenses. According to an embodiment, the camera 240 may include a plurality of lens assemblies. For example, some of the plurality of lens assemblies may have the same lens properties (e.g., angle of view, focal length, autofocus, f number, or optical zoom), or at least one lens assembly may have one or more lens properties different from lens properties of another lens assembly. The lens assembly may include a wide-angle lens or a telephoto lens. For example, the flash of the camera 240 may emit light used to enhance light emitted or reflected from the subject. According to an embodiment, the flash may include one or more light emitting diodes (e.g., red-green-blue (RGB) LED, white LED, infused LED, or ultraviolet LED), or xenon lamp. For example, the image sensor may obtain an image corresponding to the subject, by converting the light emitted or reflected from the subject and transmitted through the lens assembly into an electrical signal. According to an embodiment, the image sensor may include, for example, one image sensor selected from among image sensors with different properties, such as an RGB sensor, a black and white (BW) sensor, an IR sensor, or a UV sensor, a plurality of image sensors with the same properties, or a plurality of image sensors with different properties. Each image sensor included in the image sensor may be implemented using, for example, a charged coupled device (CCD) sensor or a complementary metal oxide semiconductor (CMOS) sensor. According to an embodiment, the wearable device 101 may include a plurality of cameras 240 having different properties or functions. For example, at least one of the plurality of cameras 240 may be a wide-angle camera, and the other may be a telephoto camera. For example, the camera 240 may be exposed through a portion of the first surface or may be exposed through a portion of the second surface. The camera 240 is illustrated in the singular, but may be plural.

For example, the camera 240 may include an eye tracking camera (ET CAM) 241 that may track the gaze of the user. For example, the wearable device 101 may identify a direction of the gaze of the user based on the image obtained through the eye tracking camera 241. For example, the wearable device 101 may identify the position of the gaze of the user on the screen, based on the image obtained through the eye tracking camera 241. Based on the position of the gaze of the user on the screen, the wearable device 101 may display a visual object (e.g., a visual object 150 in FIG. 1) at the position.

For example, the camera 240 may include a face recognition camera 242 that may identify the face of the user. For example, the wearable device 101 may identify the mouth shape and/or the facial expression of the user, using the face recognition camera 242. For example, the mouth shape of the user and/or the facial expression of the user may be included in biometric data. However, it is not limited thereto. The wearable device 101 may identify the validity of the touch input, using the mouth shape of the user and/or the facial expression of the user. For example, the wearable device 101 may identify whether to provide feedback for the touch input, based on the position of the touch input and the biometric data. For example, the wearable device 101 may identify whether to provide feedback with respect to the touch input, based on the biometric data of the user obtained through the camera 240.

According to an embodiment, the wearable device 101 may include the sensor 250. For example, the sensor 250 of the wearable device 101 may include a touch sensor 251. The touch sensor 251 may be referred to as a touch sensor panel (TSP). For example, the wearable device 101 may identify contact on the second surface opposite to the first surface on which the display 230 is positioned, using the touch sensor 251. The wearable device 101 may identify contact on the second surface based on data obtained through the touch sensor 251. The contact may be referred to as the touch input and/or the touch gesture. Based on the data obtained through the touch sensor 251, the wearable device 101 may identify the position of the external object contacted on the second surface, the pressure applied to the second surface, and/or the area of the external object contacted on the second surface. However, it is not limited thereto. For example, the wearable device 101 may identify an external object hovered on the second surface of the wearable device 101, based on the data of the touch sensor 251. That the external object hovered on the second surface may include a state where the external object is spaced apart from the second surface by less than a threshold distance set by the touch sensor 251. Based on identifying the external object hovered on the second surface, the wearable device 101 may identify a position where a portion of the external object closest to the second surface is projected onto the second surface, using the data of the touch sensor 251. The wearable device 101 may identify the identified position as a position of the external object hovered on the second surface.

For example, the sensor 250 of the wearable device 101 may include an acceleration sensor 252. According to an embodiment, the wearable device 101 may identify physical movement of the wearable device 101 based on the acceleration sensor 252. The acceleration sensor 252 may output sensor data indicating the direction and/or magnitude of acceleration (e.g., gravitational acceleration) applied to the wearable device 101, using a plurality of preset axes (e.g., x-axis, y-axis, z-axis) perpendicular to each other. Based on the sensor data indicating the acceleration, the wearable device 101 may identify the physical movement (e.g., translation motion) of the wearable device 101. In addition to the acceleration sensor 252, the wearable device 101 may include a sensor that outputs data dependent on the physical movement of the wearable device 101, such as a geomagnetic sensor, a gyro sensor, and/or a degrees of freedom (6DoF) sensor. For example, the geomagnetic sensor may output sensor data indicating a direction (e.g., a direction of the N pole) of a magnetic field applied to the wearable device 101, using two-dimensional or three-dimensional axes. The gyro sensor may be included in the wearable device 101 to measure the rotation of the wearable device 101. For example, the gyro sensor may output sensor data indicating a parameter (e.g., angular speed) indicating the rotation of the wearable device 101, based on the preset axes. For example, the 6DoF (degree of freedom) sensor may output sensor data indicating three parameters indicating the position of the wearable device 101 and three parameters indicating the orientation of the wearable device 101. The acceleration sensor 252, the geomagnetic sensor, the gyro sensor, the 6DoF sensor, or a combination thereof may be referred to as an inertia measurement unit (IMU).

According to an embodiment, the wearable device 101 may identify contact on the second surface of the housing of the wearable device 101 using the touch sensor 251. For example, the second surface may face a second direction opposite to the first direction in which the first surface on which the display 230 is positioned faces. The wearable device 101 may identify the first position of the touch input on the second surface, based on the contact on the second surface identified using the touch sensor 251. In response to identifying the first position, the wearable device 101 may display a first visual object indicating the first position on the screen through the display 230.

According to an embodiment, the wearable device 101 may identify the touch input on the second surface. The wearable device 101 may identify the position where the gaze of the user is directed based on the image obtained through the camera 240 in response to the touch input. The wearable device 101 may identify the second position of the gaze of the user within the screen. For example, the wearable device 101 may identify the second position, using the eye tracking camera 241. For example, the wearable device 101 may display a second visual object different from the first visual object at the second position based on identifying the second position.

According to an embodiment, the wearable device 101 may identify whether the distance between the first position indicated by the first visual object of the touch input and the second position corresponding to the gaze of the user is within a preset distance. For example, the preset distance may be provided by the wearable device 101 or may be set by the user. The wearable device 101 may identify that the distance between the first position and the second position is within the preset distance. For example, the wearable device 101 may provide feedback with respect to the touch input, in response to the second position identified within the preset distance from the first position of the first visual object. For example, wearable device 101 may cease to provide the feedback with respect to the touch input, in response to the second position identified outside from the first position of the first visual object by the preset distance. For example, the wearable device 101 may at least temporarily cease to identify touch input on the second surface to provide the feedback, based on the second position identified outside from the first position by the preset distance.

According to an embodiment, the wearable device 101 may display virtual objects on the screen while displaying the screen. For example, the virtual objects may be represented by numbers, figures, and/or colors. For example, the wearable device 101 may obtain registration information or may execute the function corresponding to the event, based on inputs for the virtual objects.

According to an embodiment, the wearable device 101 may display the virtual objects on the screen to generate the registration information. The wearable device 101 may identify the touch input on the second surface while displaying the virtual objects. The wearable device 101 may identify that the virtual objects are selected based on the touch input. The wearable device 101 may identify a sequence of the touch input selecting each of the virtual objects. For example, the wearable device 101 may obtain registration information associated with the sequence of the touch input selecting each of the virtual objects. For example, the wearable device 101 may obtain registration information based on a touch gesture selecting some of the virtual objects. The wearable device 101 may store the registration information in the memory 220. For example, the registration information may be referred to as high-level touch based registration. However, it is not limited thereto.

According to an embodiment, the wearable device 101 may identify the event. The wearable device 101 may display the virtual objects based on the event. The wearable device 101 may identify the inputs for the virtual objects. For example, the wearable device 101 may identify the inputs for the virtual objects based on contact with an external object on the second surface. The wearable device 101 may identify the sequence of the inputs for the virtual objects. The wearable device 101 may identify whether a first sequence of the inputs for the virtual objects and the second sequence included in the registration information match. The wearable device 101 may execute the function corresponding to the event, based on that the first sequence and the second sequence match. For example, the function corresponding to the event may include a 'go back' function that returns to the previous screen. The function corresponding to the event may include a 'go forward' function that moves to the subsequent screen. The function corresponding to the event may include a 'go home' function for displaying a home screen. The function corresponding to the event may include a 'display running apps' function for displaying a list of running applications (e.g., software applications). The function corresponding to the event may include a 'specific app execution' function for executing an application specified by the user or provided by the wearable device 101. For example, the function corresponding to the event may include a 'rendering mode change' function for changing the rendering mode. For example, the function corresponding to the event may include a 'password auto-complete' function that automatically enters the password in the text field for entering the password when entering the password. For example, the function corresponding to the event may include a function set by the user. For example, the function set by the user may include connecting a phone call to a preset person and/or connecting a video call to the preset person. For example, the function corresponding to the event may include a function for unlocking the HMD lock mode. However, it is not limited thereto.

Figure 3:
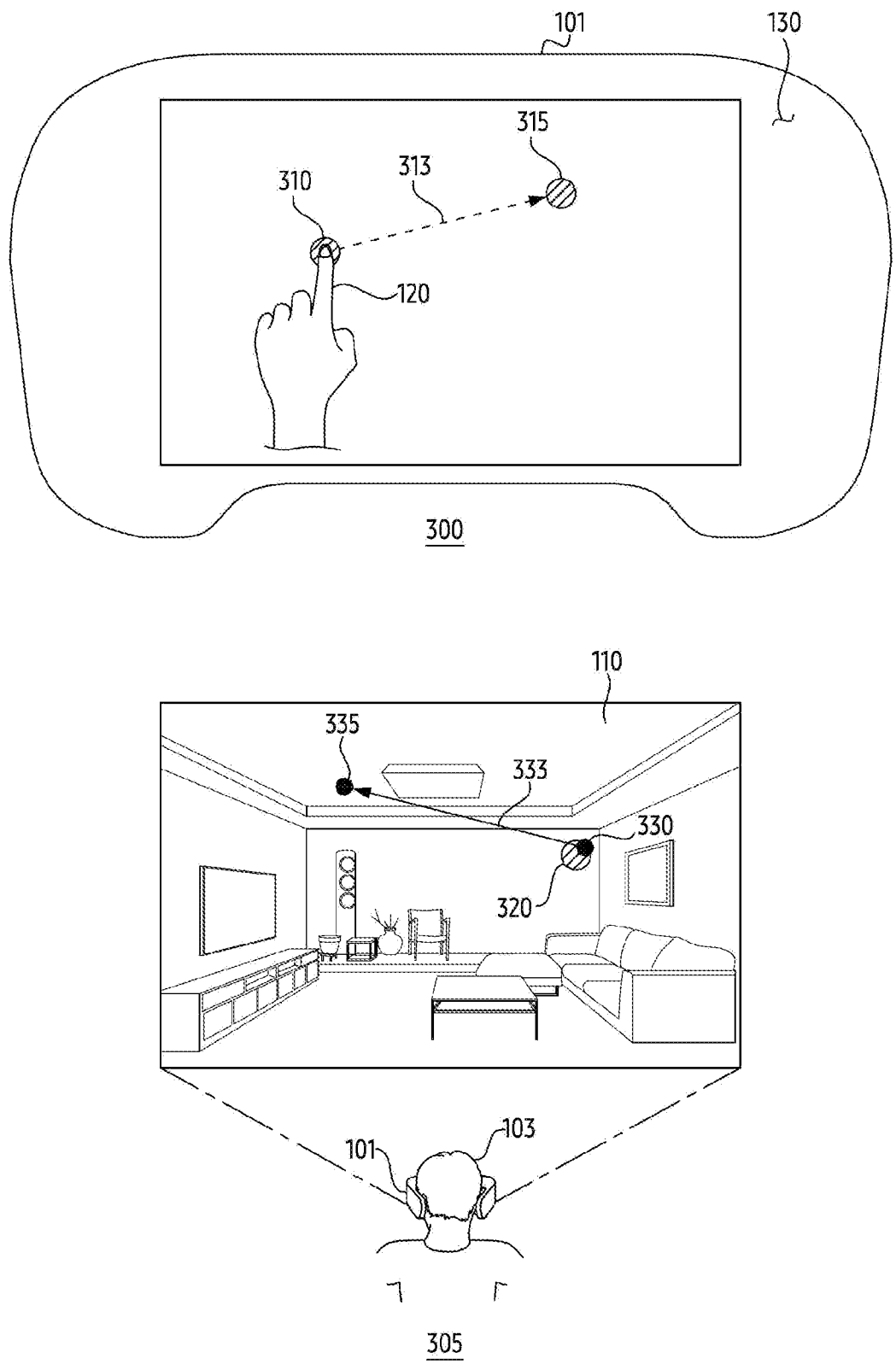
FIG. 3 is a diagram illustrating an example of a wearable device that recognizes a touch input on a wearable device according to an embodiment.

FIG. 3 is a diagram illustrating an example of a wearable device that recognizes a touch input on a wearable device according to an embodiment. A wearable device 101 of FIG. 3 may include the wearable device 101 of FIG. 1 and/or FIG. 2. The operations of FIG. 3 may be performed by the processor 210 of FIG. 2.

Referring to FIG. 3, a third example 300 may be an example of a second surface 130 opposite to a first surface on which a display (e.g., a display 230 of FIG. 2) of the wearable device 101 is positioned. A fourth example 305 may be an example of a screen 110 displayed through the display of the wearable device 101.

Referring to FIG. 3, according to an embodiment, the wearable device 101 may identify contact of an external object 120 on the second surface 130. For example, the wearable device 101 may identify a touch input (or a touch gesture) for the contact. The wearable device 101 may display a visual object 320 based on identifying contact at a first position 310. The wearable device 101 may display the first visual object 320 indicating the first position 310.

According to an embodiment, the wearable device 101, while identifying the first visual object 320, may track the gaze of the user 103, based on an image obtained through a camera (e.g., a camera 240 or an eye tracking camera 241 of FIG. 2). For example, the wearable device 101 may identify a second position of the gaze of the user 103 within the screen 110. The wearable device 101 may display a second visual object 330 at the second position of the screen 110, in response to identifying the second position. For example, the first visual object 320 and the second visual object 330 may be represented in different colors. For example, the first visual object 320 and the second visual object 330 may be represented in different sizes.

For example, the wearable device 101 may identify the movement of the external object 120 on the second surface 130 while displaying the first visual object 320 and the second visual object 330. The wearable device 101 may identify a movement path 313 of the external object 120 on the second surface 130. The wearable device 101 may identify the moved third position 315 based on the movement path 313. The wearable device 101 may identify contact of the external object 120 at the third position 315. For example, the contact of the external object 120 from the first position 310 to the third position 315 may be referred to as a drag input (or a drag gesture). For example, the drag input (or the drag gesture) may be referred to as the touch input. For example, the wearable device 101 may refrain from moving the first visual object 320 displayed on the screen 110 even if it identifies the movement of the contact.

According to an embodiment, the wearable device 101 may identify the movement of the gaze of the user 103 corresponding to the movement path 313 of a contact point. For example, while the contact by the external object 120 is moving, the wearable device 101 may move the second visual object 330 within the screen 110 by tracking the gaze of the user 103. The wearable device 101 may display a second visual object 335 corresponding to a movement path 333 of the gaze of the user 103 on the screen 110. The wearable device 101 may provide feedback with respect to the drag input (or the drag gesture), based on that the movement path 313 of the contact point and the movement path of the gaze indicated by the second visual object 330 on the screen 110 match at least in portion.

As described above, according to an embodiment, the wearable device 101 may provide feedback with respect to the touch input, based on the gaze of the user 103 that matches the position of the first visual object 320 corresponding to the touch input. The wearable device 101 may accurately input the input desired by the user 103 of the wearable device 101, by providing the feedback based on the position of the first visual object 320 and the gaze of the user 103.

Figure 4:
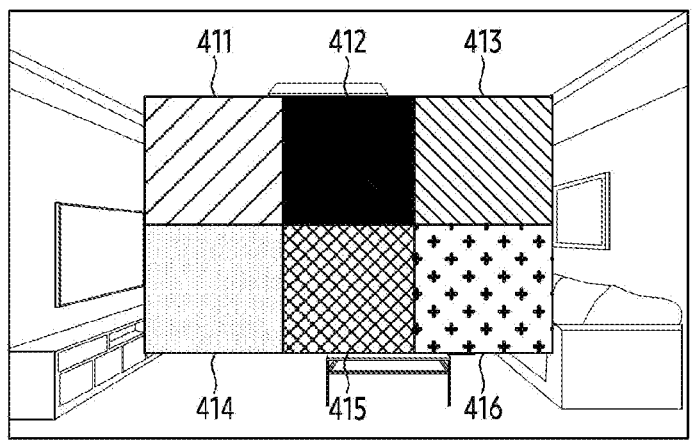
FIG. 4 is a diagram illustrating an example of screens to be displayed based on identification of an event, according to an embodiment.
Figure 4:
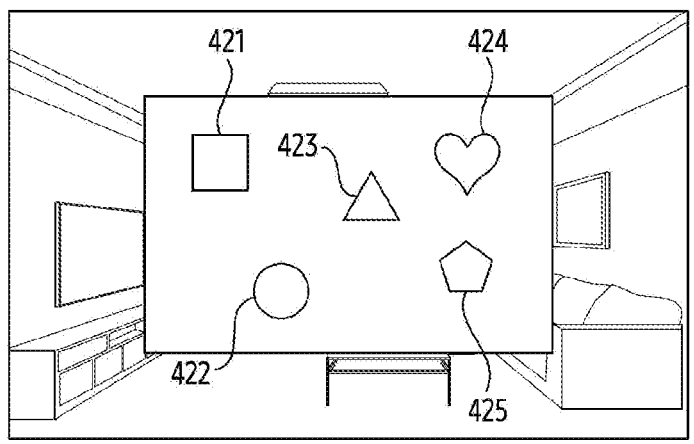
Figure 4:
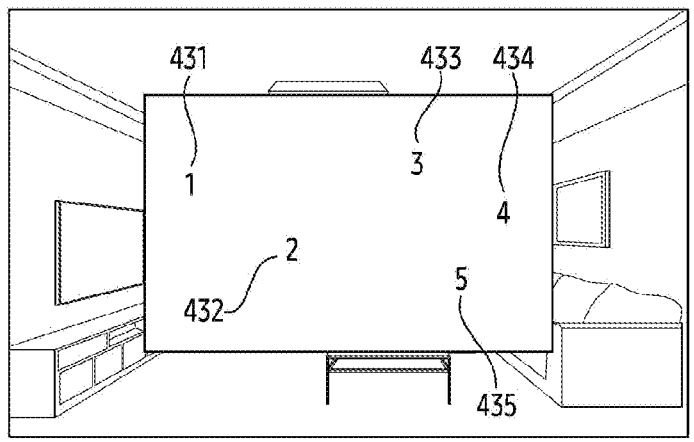

FIG. 4 is a diagram illustrating an example of screens to be displayed based on identification of an event, according to an embodiment. The operations of FIG. 4 may be performed by a processor 210 of FIG. 2. A fifth example 401, a sixth example 402, and/or a seventh example 403 illustrated in FIG. 4 may be an example of a screen displayed through a display of a wearable device 101. The fifth example 401, the sixth example 402, and/or the seventh example 403 of FIG. 4 may be an example of a screen for obtaining registration information.

Referring to FIG. 4, in the fifth example 401, according to an embodiment, the wearable device 101 may display the same screen as the fifth example 401. For example, the wearable device 101 may display an area divided into a plurality of partial areas 410 within the screen. The plurality of partial areas 410 may include a first partial area 411, a second partial area 412, a third partial area 413, a fourth partial area 414, a fifth partial area 415, and/or a sixth partial area 416. For example, each of the plurality of partial areas 410 may be represented in different colors. For example, the wearable device 101 may display the first partial area 411 of a first color, the second partial area 412 of a second color, the third partial area 413 of a third color, the fourth partial area 414 of a fourth color, the fifth partial area 415 of a fifth color, and/or the sixth partial area 416 of a sixth color. An example in which the plurality of partial areas 410 are divided into the first partial area 411 to the sixth partial area 416 is illustrated, but it is not limited thereto.

In the sixth example 402, according to an embodiment, the wearable device 101 may display a plurality of virtual objects 420 within the screen. For example, the plurality of virtual objects 420 may include a polygon such as a triangle, a quadrangle, a pentagon, and a hexagon. For example, the plurality of virtual objects 420 may be represented in a shape such as a circle, a heart, a star, a sun, and/or a moon. However, it is not limited thereto. For example, the wearable device 101 may display the first virtual object 421 represented as the quadrangle, the second virtual object 422 represented as the circle, the third virtual object 423 represented as the triangle, the fourth virtual object 424 represented as the heart, and/or the fifth virtual object 425 represented as the pentagon. An example in which the plurality of virtual objects 420 are represented as the first virtual object 421 to the fifth virtual object 425 is illustrated, but it is not limited thereto.

In the seventh example 403, according to an embodiment, the wearable device 101 may display a plurality of texts 430 within the screen. For example, the plurality of texts 430 may be represented in Arabic numerals. For example, the plurality of texts 430 may be represented in Roman numerals. For example, the plurality of texts 430 may be represented in alphabets. For example, the plurality of texts 430 may be represented in Greek letters. However, the plurality of texts 430 are not limited to the above-described examples, and may be represented in characters identifiable by humans. In the seventh example 403, the wearable device 101 may display a first text 431 represented in Arabic numeral '1', a second text 432 represented in Arabic numeral '2', the third text 433 represented in Arabic numeral '3', a fourth text 434 represented in Arabic numeral '4, and/or a fifth text 435 represented in Arabic numeral '5'.

According to an embodiment, while displaying a screen such as the fifth example 401 to the seventh example 403, the wearable device 101 may identify inputs for the partial areas 410, the virtual objects 420, and/or the texts 430 displayed on the screen. While displaying the screen such as the fifth example 401 to the seventh example 403, the wearable device 101 may identify the inputs and may identify positions and/or directions of the gaze of the user corresponding to the inputs. The wearable device 101 may store the sequence of the inputs and the positions and/or directions of the gaze in a memory (e.g., a memory 220 of FIG. 2) as the registration information.

In FIG. 4, the screens represented as the fifth example 401 to the seventh example 403 have been described, but the registration information may be identified by a combination of contents included in the above-described screens.

As described above, according to an embodiment, the wearable device 101 may obtain the registration information for executing a function corresponding to the event. For example, the registration information may be substantially the same as a password using a pattern in a mobile phone terminal. The wearable device 101 may enhance the security of the wearable device 101 by obtaining the registration information.

Figure 5A:
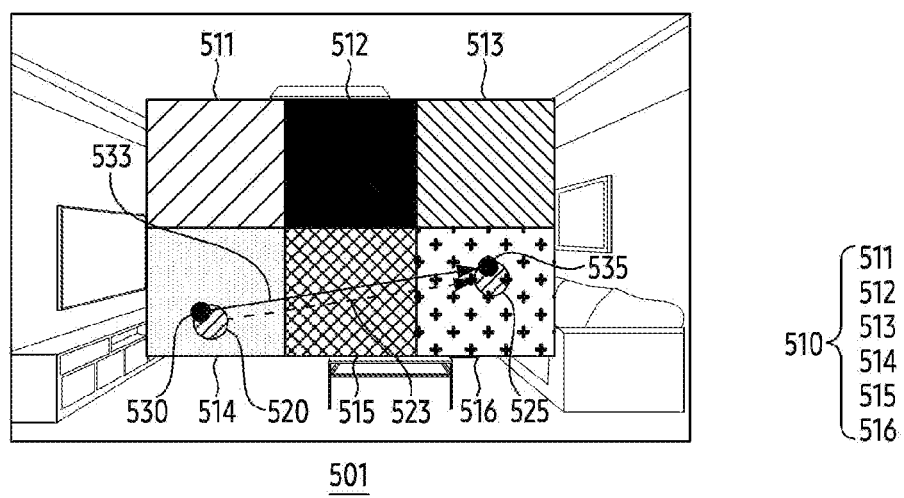
FIG. 5A is a diagram illustrating an example of a screen associated with information stored in a memory, according to an embodiment.
Figure 5B:
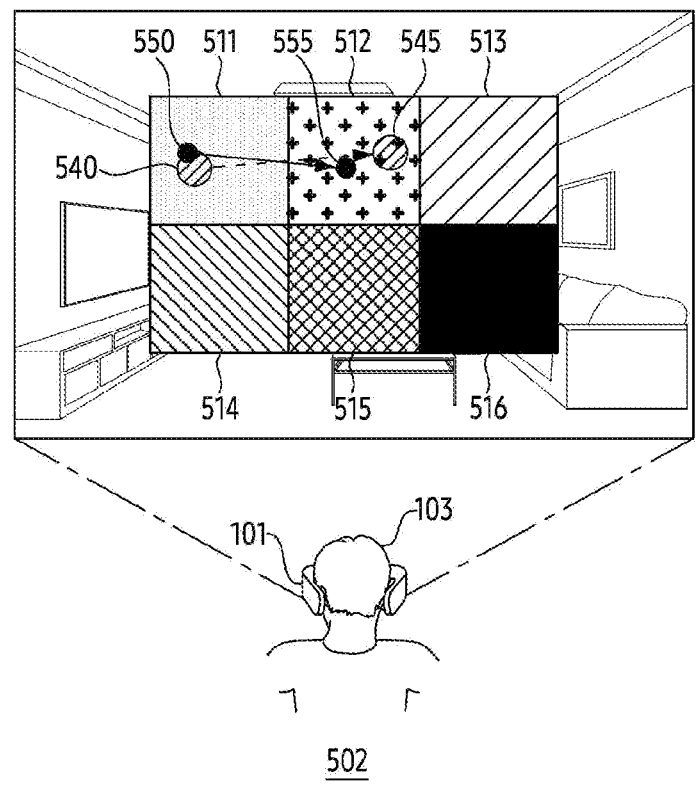
FIG. 5B is a diagram illustrating an example of a screen of a wearable device based on identification of an event according to an embodiment.
Figure 5B:
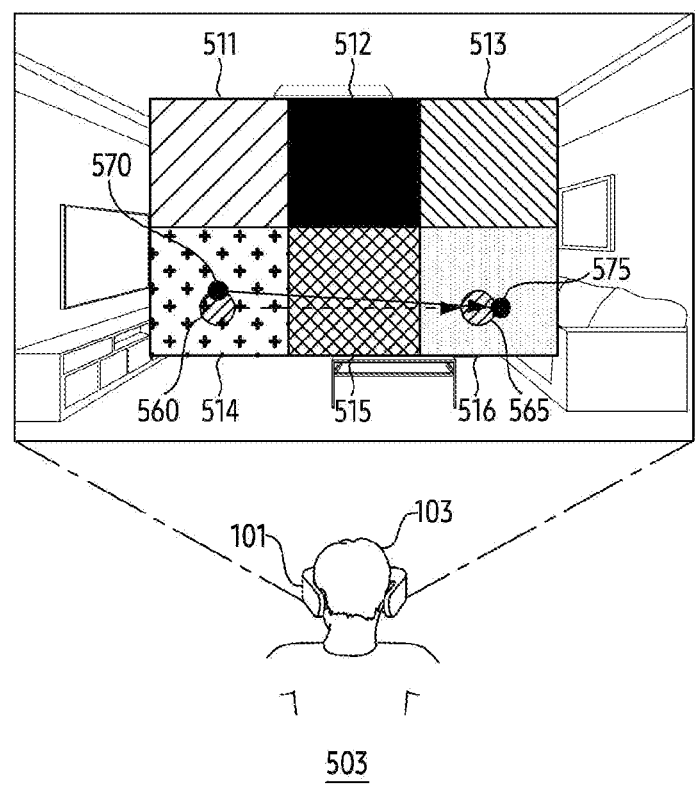

FIG. 5A is a diagram illustrating an example of a screen associated with information stored in a memory, according to an embodiment. FIG. 5B is a diagram illustrating an example of a screen of a wearable device based on identification of an event according to an embodiment. A wearable device 101 of FIGS. 5A and 5B, may include the wearable device 101 of FIGS. 1, 2, 3, and/or 4. The operations of FIGS. 5A and 5B, may be performed by a processor 210 of FIG. 2. The touch gesture described below may include a touch input. The touch gesture may be referred to as a user input.

An eighth example 501 of FIG. 5A may be an example in which the wearable device 101 obtains registration information. According to an embodiment, the wearable device 101 may display a plurality of partial areas 510 such as a fifth example 401 of FIG. 4 on the screen. The wearable device 101, while displaying the plurality of partial areas 510 on the screen, may identify a contact on a second surface opposite to a first surface on which a display (e.g., a display 230 of FIG. 2) is positioned. The wearable device 101 may identify the touch gesture based on the contact. The wearable device 101 may display a first visual object at a first position 520 corresponding to the position of the contact. The wearable device 101, while displaying the first visual object at the first position 520, may identify the gaze of the user from an image obtained through a camera (e.g., a camera 240 of FIG. 2) exposed outside at a portion of the first surface. For example, the wearable device 101 may identify a second position 530 of the gaze of the user within the screen based on the image obtained through the camera. The wearable device 101 may display a second visual object based on identifying the second position 530. For example, the wearable device 101 may display the first visual object and the second visual object on a fourth partial area 514 of a fourth color among a first partial area 511 to a sixth partial area 516.

For example, the wearable device 101 may identify a touch gesture that moves from the fourth partial area 514 to the sixth partial area 516 after displaying the first visual object and the second visual object in the fourth partial area 514 of the fourth color. The wearable device 101 may identify the gaze of the user moving to the sixth partial area 516 of the sixth color. The wearable device 101 may identify a moving direction of the touch gesture and/or a moving speed of the touch gesture. The wearable device 101 may identify a moving direction of the gaze of the user and/or a moving speed of the gaze of the user. The wearable device 101 may display the first visual object (e.g., the first visual object displayed on a position 525) corresponding to the touch gesture and the second visual object (e.g., the second visual object displayed on a position 535) corresponding to the gaze of the user on the sixth partial area 516 of the sixth color. The wearable device 101 may store the colors of the partial area in which the first visual object and the second visual object are displayed in the registration information, based on the first visual object and the second visual object displayed on the fourth partial area 514 of the fourth color, and the first visual object and the second visual object moved from the fourth partial area 514 to the sixth partial area 516 along each of directions 523, 533. The wearable device 101 may store the moving direction and/or the moving speed of the touch gesture in the registration information. The wearable device 101 may store the moving direction and/or the moving speed of the gaze of the user in the registration information. For example, the wearable device 101 may store the registration information in a memory (e.g., a memory 220 of FIG. 2).

Referring to FIG. 5B, according to an embodiment, the wearable device 101 may display the plurality of partial areas 510 on the top layer of the screen in response to identification of the event. In a ninth example 502, the wearable device 101 may display the first partial area 511 of the fourth color, a second partial area 512 of the sixth color, a third partial area 513 of a first color, the fourth partial area 514 of a third color, a fifth partial area 515 of a fifth color, and a sixth partial area 516 of a second color. The wearable device 101 may identify the touch gesture while displaying the plurality of partial areas 510. For example, the wearable device 101 may display the first visual object at a third position 540 in response to identifying a touch gesture indicating selecting the first partial area 511. The wearable device 101 may display the second visual object at the fourth position 550 in response to identifying the gaze of the user 103 facing the first partial area 511. The wearable device 101 may identify a touch gesture moving from the first partial area 511 to the second partial area 512. In response to the touch gesture moving from the first partial area 511 to the second partial area 512, the wearable device 101 may move the first visual object using a direction and speed corresponding to the touch gesture (e.g., the first visual object moved from the third position 540 to a position 545). In response to the gaze of the user 103 moving from the first partial area 511 to the second partial area 512, the wearable device 101 may move the second visual object using a direction and speed corresponding to the gaze of the user 103 (e.g., the second visual object moved from the fourth position 550 to a position 555).

According to an embodiment, the wearable device 101 may compare the color and registration information of each of the areas where the first visual object and the second visual object are displayed. For example, in case that the registration information is the same as or similar to the eighth example 501 of FIG. 5A, the wearable device 101 may identify data associated with the fourth color and the sixth color within the registration information. The wearable device 101 may execute a function corresponding to the event, based on displaying visual objects (e.g., the first visual object and the second visual object) in the first partial area 511 of the fourth color and the second partial area 512 of the sixth color, through the gaze of the user 103. The wearable device 101 may execute the function corresponding to the event, since the data associated with the colors included in the registration information are the same as or similar to the colors of the partial areas selected by the touch gesture and the gaze of the user 103.

Referring to a tenth example 503, according to an embodiment, the wearable device 101 may display the plurality of partial areas 510 on the top layer of the screen, in response to the event. For example, the wearable device 101 may display the first partial area 511 of the first color, the second partial area 512 of the second color, the third partial area 513 of the third color, the fourth partial area 514 of the sixth color, the fifth partial area 515 of the fifth color, and the sixth partial area 516 of the fourth color. While displaying the plurality of partial areas 510, the wearable device 101 may identify a touch gesture on the second surface selecting the fourth partial area 514. The wearable device 101 may identify the gaze of the user 103 facing the fourth partial area 514. The wearable device 101 may display the first visual object (e.g., the first visual object displayed on a position 560) based on the touch gesture and the second visual object (e.g., the second visual object displayed on a position 570) based on the gaze of the user 103 on the fourth partial area 514. The wearable device 101 may identify a touch gesture on the second surface moving from the fourth partial area 514 to the sixth partial area 516. The wearable device 101 may identify the gaze of the user 103 moving from the fourth partial area 514 to the sixth partial area 516. The wearable device 101 may display the first visual object moving from the fourth partial area 514 to the sixth partial area 516 (e.g., the first visual object moved from the position 560 to a position 565), and the second visual object moving from the fourth partial area 514 to the sixth partial area 516 (e.g., the second visual object moved from the position 570 to a position 575).

According to an embodiment, the wearable device 101 may compare the colors and registration information of partial areas where the first visual object and the second visual object are displayed. The wearable device 101 may identify that the color of the partial areas is different from the color included in the registration information. For example, in case that the registration information includes data associated with the fourth color and the sixth color, and the colors of the partial areas where the visual objects are displayed are the sixth color and the fourth color, the wearable device 101 may compare the sequence in which the colors are input. For example, in case that the registration information includes data in which the fourth color is identified before the sixth color, and that the sixth color is identified before the fourth color by the user input (e.g., the touch gesture and the gaze of the user) responding to the event, the wearable device 101 may identify that the sequence in which the colors are input is different. The wearable device 101 may cease to execute the function corresponding to the event, based on that the sequence in which the colors are input is different. For example, the wearable device 101 may refrain from executing the function corresponding to the event in response to the fact that the sequence in which the colors are input is different. The wearable device 101 may refrain from executing the function corresponding to the event, since the sequence of input for colors is different even if the user input is substantially the same as the position information included in the registration information.

As described above, according to an embodiment, the wearable device 101 may identify whether the user input and the registration information are the same. The wearable device 101 may execute or cease the function corresponding to the event, based on the user input and the registration information. The wearable device 101 may strengthen the security of the wearable device 101 by executing the function corresponding to the event based on the user input and the registration information.

Figure 6A:
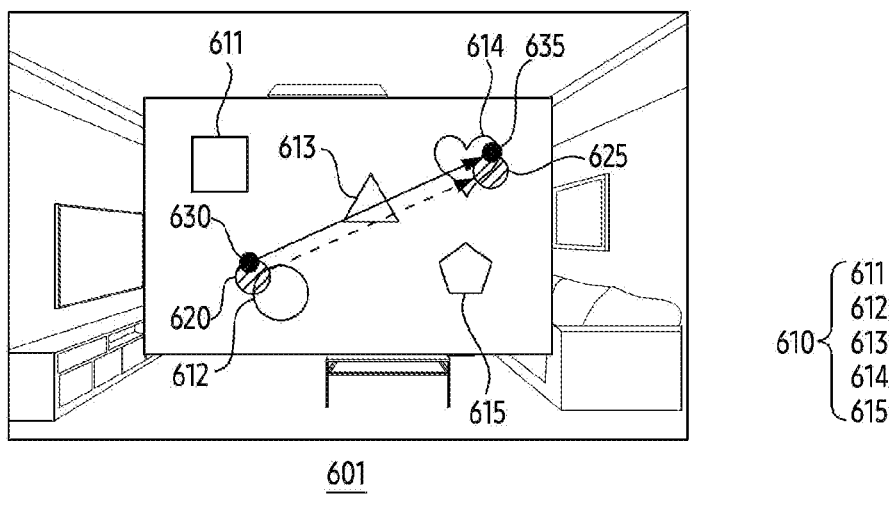
FIG. 6A is a diagram illustrating an example of a screen of a wearable device based on identification of an event according to an embodiment.
Figure 6B:
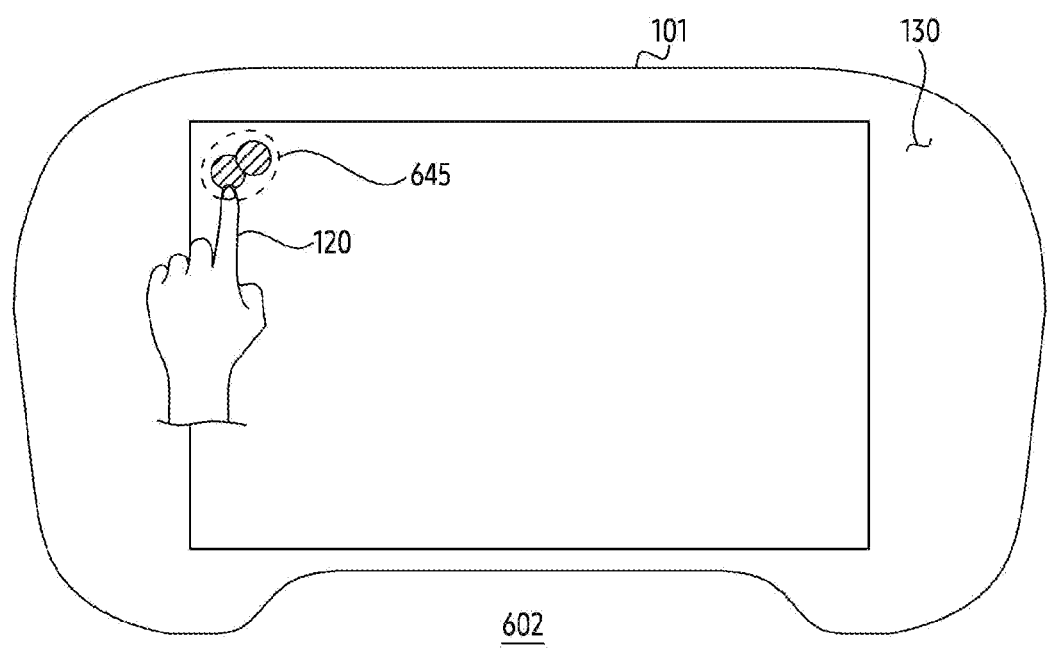
FIG. 6B is a diagram illustrating an example of a screen associated with information stored in a memory, according to an embodiment.
Figure 6B:
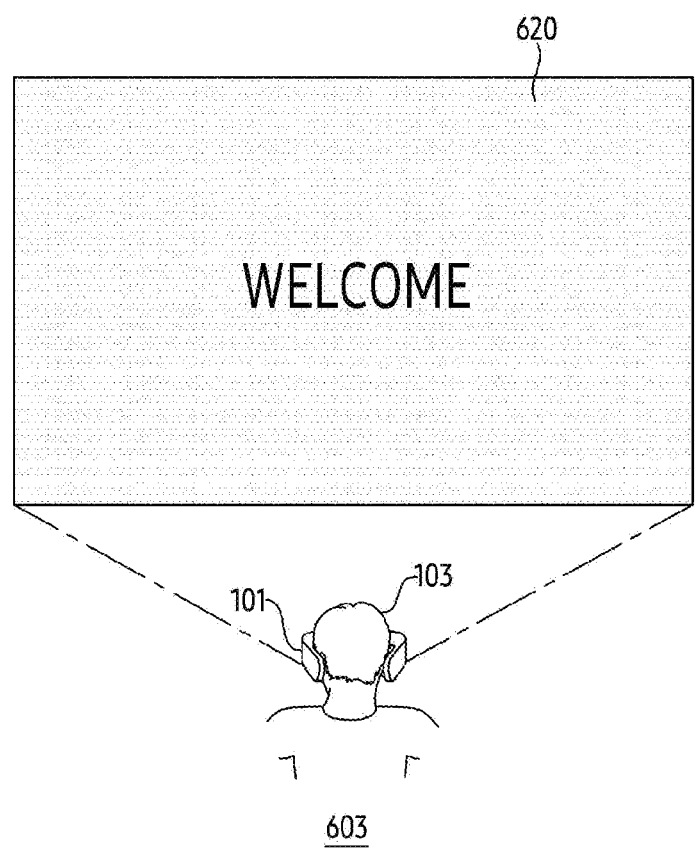
Figure 6C:
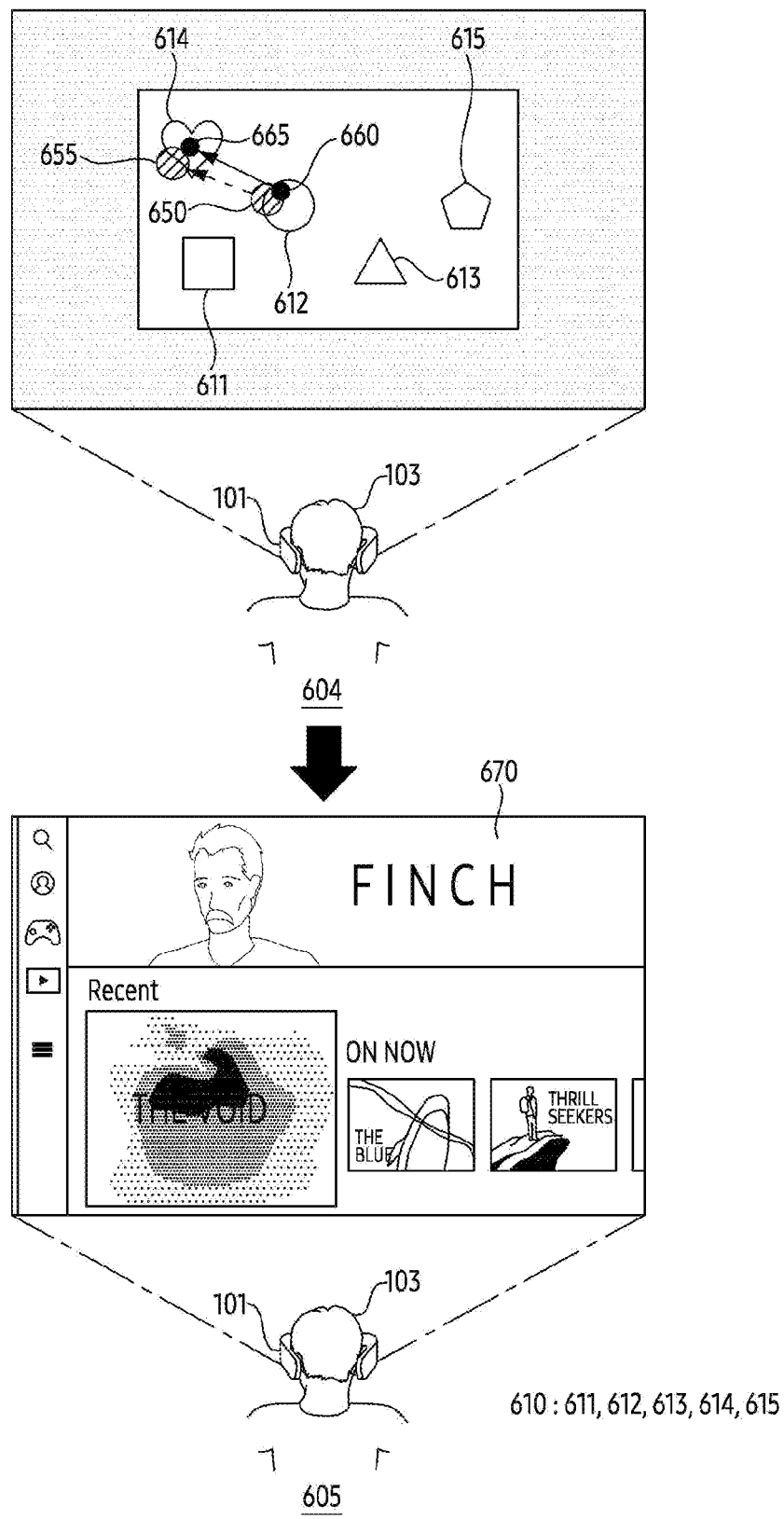
FIG. 6C is a diagram illustrating an example of a screen of a wearable device based on identification of an event according to an embodiment.
Figure 6D:
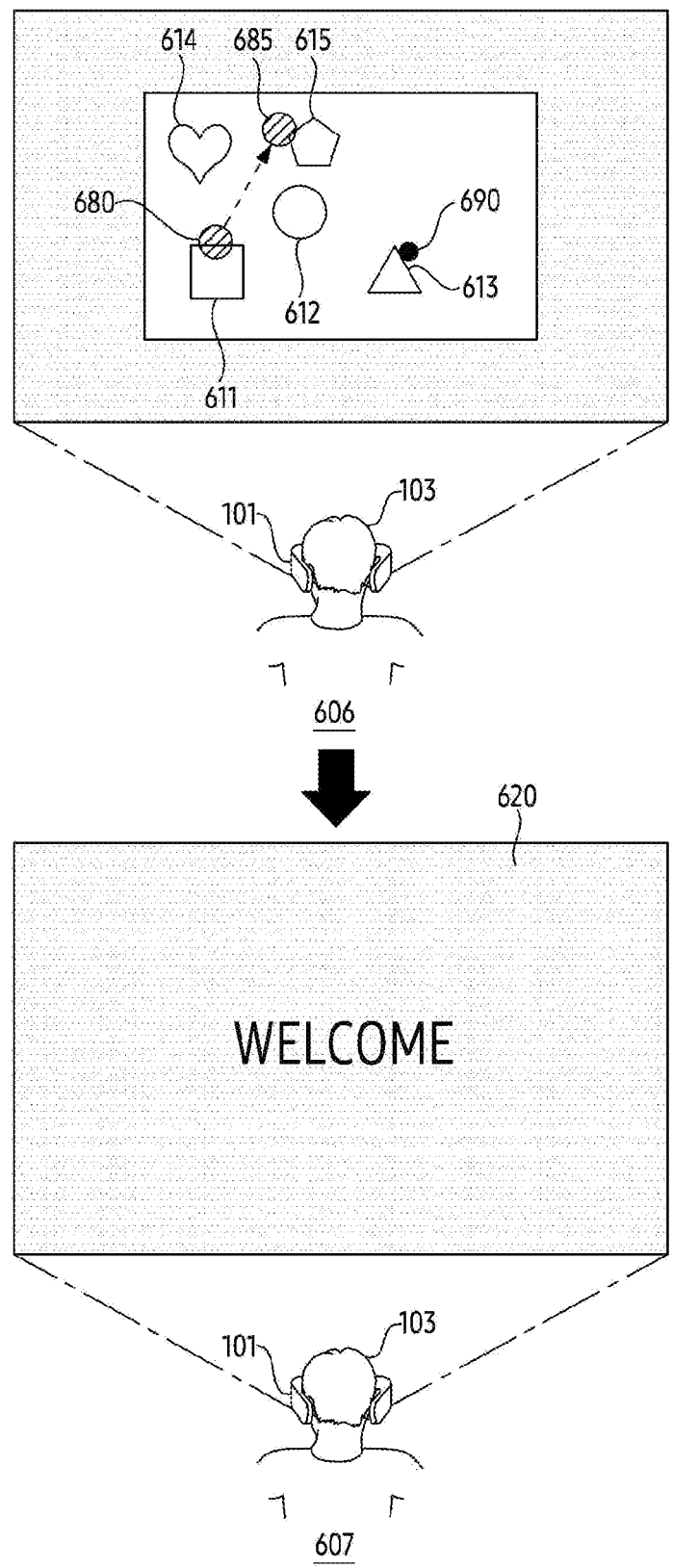
FIG. 6D is a diagram illustrating an example of a screen of a wearable device based on identification of an event according to an embodiment.

FIG. 6A is a diagram illustrating an example of a screen of a wearable device based on identification of an event according to an embodiment. FIG. 6B is a diagram illustrating an example of a screen associated with information stored in a memory, according to an embodiment. FIG. 6C is a diagram illustrating an example of a screen of a wearable device based on identification of an event according to an embodiment. FIG. 6D is a diagram illustrating an example of a screen of a wearable device based on identification of an event according to an embodiment. A wearable device 101 of FIGS. 6A, 6B, 6C, and/or 6D may include the wearable device 101 of FIGS. 1, 2, 3, 4, 5A, 5B, and/or 5C. The operations of FIGS. 6A, 6B, 6C, and/or 6D may be performed by a processor 210 of FIG. 2.

Referring to FIG. 6A, according to an embodiment, the wearable device 101 may obtain registration information. For example, the registration information may be obtained based on the position of the gaze of the user within the screen and a touch input (or a touch gesture) on a second surface that is different from a first surface on which a display (e.g., a display 230 of FIG. 2) is positioned. In an eleventh example 601, the wearable device 101 may display a plurality of virtual objects 610 (e.g., a first virtual object 611, a second virtual object 612, a third virtual object 613, a fourth virtual object 614, and/or a fifth virtual object 615) on the screen. The wearable device 101 may display the plurality of virtual objects 610 based on an event for obtaining the registration information. The wearable device 101 may identify a user input for the plurality of virtual objects 610 while displaying the plurality of virtual objects 610. For example, the user input may be identified based on the touch input (or the gesture) on the second surface, and/or a position identified by the gaze of the user.

According to an embodiment, the wearable device 101 may display an area including the plurality of virtual objects 610 on the screen. The wearable device 101 may identify an input selecting the plurality of virtual objects 610. For example, the wearable device 101 may display a first visual object 620 indicating a first position of the touch input on the second surface, based on contact on the second surface. The wearable device 101 may display the first visual object 620 selecting a second virtual object 612. The wearable device 101 may identify a second position of the gaze of the user within the screen based on an image obtained through a camera (e.g., a camera 240 of FIG. 2). For example, the wearable device 101 may display a second visual object 630 at the second position. The wearable device 101 may identify a first user input for the second virtual object 612, based on identifying the second position adjacent to the position where the touch input was identified within a preset duration, from timing identifying the touch input that selects the second virtual object 612. For example, at timing when the wearable device 101 identifies the first user input for the second virtual object 612, the positions of the second visual object 630 displayed based on the gaze and the first visual object 620 displayed based on the touch input may overlap or be adjacent to each other within the screen.

According to an embodiment, the wearable device 101 may identify a third position of the touch input on the second surface. For example, the wearable device 101 may identify a drag input moved from the first position to the third position. For example, the wearable device 101 may identify a touch input at the first position and may identify a touch input at the second position distinct from the touch input at the first position. The wearable device 101 may display a first visual object 625 indicating the second position on the screen. For example, the wearable device 101 may display the first visual object 625 that selects a fourth visual object 614. The wearable device 101 may identify a fourth position of the gaze of the user within the screen, based on the image obtained through the camera. The wearable device 101 may display a second visual object 635 at the fourth position. For example, the wearable device 101 may identify a second user input for a fourth virtual object 614, based on identifying the fourth position (e.g., a position of the second visual object 635), which is included in the fourth virtual object 614, and based on the gaze within the preset duration, from the timing identifying the touch input that selects the fourth virtual object 614.

According to an embodiment, the wearable device 101 may obtain the registration information based on the first user input and the second user input. For example, the wearable device 101 may obtain registration information including the sequence in which the first user input and the second user input were identified. The wearable device 101 may store the registration information in the memory (e.g., a memory 220 of FIG. 2).

Referring to FIG. 6B, a twelfth example 602 may be an example of the wearable device 101 that identifies a touch gesture by an external object 120 on a second surface 130 opposite to the first surface on which the display of the wearable device 101 is positioned. A thirteenth example 603 may be an example of a screen 620 on which the wearable device 101 is booted. For example, the thirteenth example 603 may be an example of the screen 620 on which the wearable device 101 is displayed in a locked state. For example, the screen 620 displayed in the locked state may be referred to as a locked screen. For example, the wearable device 101 may identify the contact of the external object 120 on the second surface 130 opposite to the first surface on which the display 620 is displayed, while displaying the screen 620. The wearable device 101 may identify the touch gesture (or the touch input) based on the contact of the external object 120. The twelfth example 602 may be an example in which a double-tap gesture 645 is identified on the second surface 130 of the wearable device 101. The wearable device 101 may display a screen for unlocking the locked state based on the double-tap gesture 645.

Referring to FIG. 6C, according to an embodiment, the wearable device 101 may display the plurality of virtual objects 610, such as a fourteenth example 604, in response to the double-tap gesture 645 of FIG. 6B. The wearable device 101 may identify inputs for the plurality of virtual objects 610. For example, the double-tap gesture 645 may be an event for unlocking the locked state of the wearable device 101.

According to an embodiment, the wearable device 101 may identify a first touch input on the second surface. For example, the wearable device 101 may identify the first position 650 on a screen of the first touch input, in response to the first touch input on the second surface. For example, the wearable device 101 may display a first visual object at the first position 650 in response to the first touch input. The wearable device 101 may identify the position of the gaze of the user based on an image obtained through the camera. For example, the wearable device 101 may identify a second position 660 of the gaze of the user within the screen using an eye tracking camera (e.g., an eye tracking camera 241 of FIG. 2). The wearable device 101 may identify that the first touch input is valid, in response to the second position 660 identified within a preset distance from the first position 650. The wearable device 101 may identify that the first touch input is valid, in response to the second position 660 identified within the preset duration from timing when the first position 650 is identified. For example, the wearable device 101 may identify that the second virtual object 612 is selected by the first touch input.

According to an embodiment, based on a second touch input on the second surface, the wearable device 101 may identify a third position 655 corresponding to the second touch input. The wearable device 101 may display the first visual object at the third position 655. The wearable device 101 may identify the gaze of the user based on the image obtained through the camera. For example, the wearable device 101 may identify the gaze of the user using the eye tracking camera. The wearable device 101 may identify a fourth position 665 of the gaze of the user within the screen. The wearable device 101 may identify that the second touch input for the third position 655 is valid, in response to identifying the fourth position 665 within the preset duration from the timing when the third position 655 is identified. For example, the wearable device 101 may identify that the second touch input for the third position 655 is valid, based on identifying the fourth position 665 within the preset distance from the third position 655. The wearable device 101 may identify that the fourth visual object 614 is selected by the first touch input.

According to an embodiment, the wearable device 101 may compare virtual objects selected by the first touch input and the second touch input with the registration information. For example, the wearable device 101 may compare the sequence in which the virtual objects are selected, included in the registration information, and the sequence in which the virtual objects are selected by the touch input. For example, in the eleventh example 601 of FIG. 6A, the wearable device 101 may identify a first sequence in which the fourth virtual object 614 is selected after the second virtual object 612 is selected from the registration information. In the fourteenth example 604 of FIG. 6C, the wearable device 101 may identify a second sequence in which the fourth virtual object 614 selected by the second touch input is identified after the second virtual object 612 is selected by the first touch input. The wearable device 101 may identify that virtual objects having the same the first sequence and the second sequence are selected in the same sequence. The wearable device 101 may unlock the locked state of the wearable device 101, in response to the fact that the first sequence and the second sequence are the same. For example, the wearable device 101 may execute an unlocking function of the wearable device 101 in response to the fact that the first sequence and the second sequence are the same.

Referring to a fifteenth example 605 of FIG. 6C, an example of a screen 670 displayed by the wearable device 101 is illustrated based on the execution of the unlocking function. The screen 670 may include a home screen that is provided by the wearable device 101 and includes a list of applications installed in the wearable device 101. The screen 670 may include a screen displayed before the wearable device 101 enters the locked state. The screen 670 may be provided from an application executed before the wearable device 101 enters the locked state. The embodiment is not limited thereto, and the screen 670 may be displayed based on an application set to be executed based on execution of the unlocking function.

Referring to FIG. 6D, according to an embodiment, the wearable device 101 may display the plurality of virtual objects 610 such as a sixteenth example 606, in response to the double-tap gesture 645 of FIG. 6B. The wearable device 101 may identify an input for the plurality of virtual objects 610.

According to an embodiment, the wearable device 101 may identify a third touch input on the second surface. For example, the wearable device 101 may identify a fifth position 680 on a screen of the third touch input, in response to the third touch input on the second surface. For example, the wearable device 101 may display the first visual object at the fifth position 680 in response to the first touch input. The wearable device 101 may identify the position of the gaze of the user based on the image obtained through the camera. For example, the wearable device 101 may identify a sixth position 690 of the gaze of the user within the screen, using the eye tracking camera. The wearable device 101 may cease to execute the unlocking function, in response to the sixth position 690 identified outside from the fifth position 680 by the preset distance.

For example, the wearable device 101 may identify a fourth touch input at a sixth position 685 after the third touch input for the fifth position 680. After identifying the fourth touch input at the sixth position 685, the wearable device 101 may identify that the fourth touch input at the sixth position 685 is not valid, based on that the position of the gaze of the user is not identified within the preset distance from the sixth position 685 within the preset duration.

According to an embodiment, the wearable device 101 may cease to execute a function corresponding to the event, based on that the types of virtual objects included in the registration information and the sequence in which the virtual objects are selected are different from the virtual objects identified by the touch inputs. The wearable device 101 may refrain from executing the function corresponding to the event, based on that the touch input is not valid. The wearable device 101 may refrain from executing the function corresponding to the event, based on that the sequence of touch inputs is different from the sequence included in the registration information. A seventeenth example 607 of FIG. 6D may be an example of the wearable device 101 that displays the screen 620 of the locked state, by ceasing the unlocking function.

In FIGS. 6A to 6D, the operation of executing the function corresponding to the event based on the virtual objects has been described above, but the wearable device 101 may execute the function corresponding to the event based on a plurality of partial areas and/or a plurality of texts.

As described above, according to an embodiment, the wearable device 101 may identify the first sequence in which the virtual objects included in the registration information are selected. The wearable device 101 may identify the second sequence in which the virtual objects are selected within a screen for executing the function corresponding to the event. The wearable device 101 may identify whether to execute the function corresponding to the event, based on the first sequence and the second sequence. The wearable device 101 may execute the function corresponding to the event in response to the fact that the first sequence and the second sequence are identified equally, may cease to execute the function corresponding to the event based on that the first sequence and the second sequence are identified differently. The wearable device 101 may strengthen the security of the wearable device 101 by executing the function corresponding to the event based on the first sequence and the second sequence.

Figure 7A:
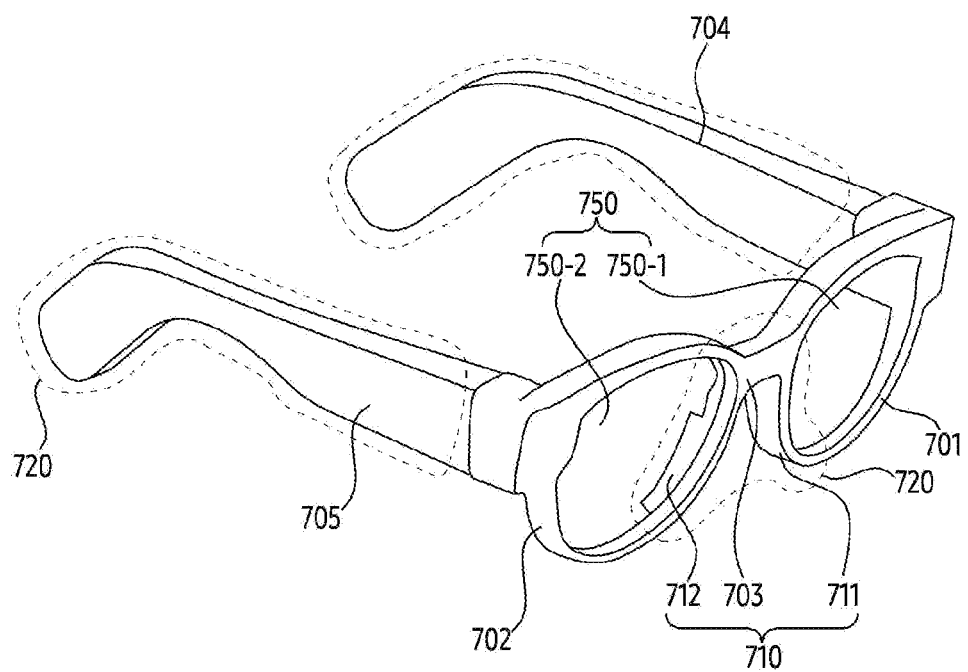
FIG. 7A is a perspective view illustrating an example wearable device according to an embodiment.
Figure 7B:
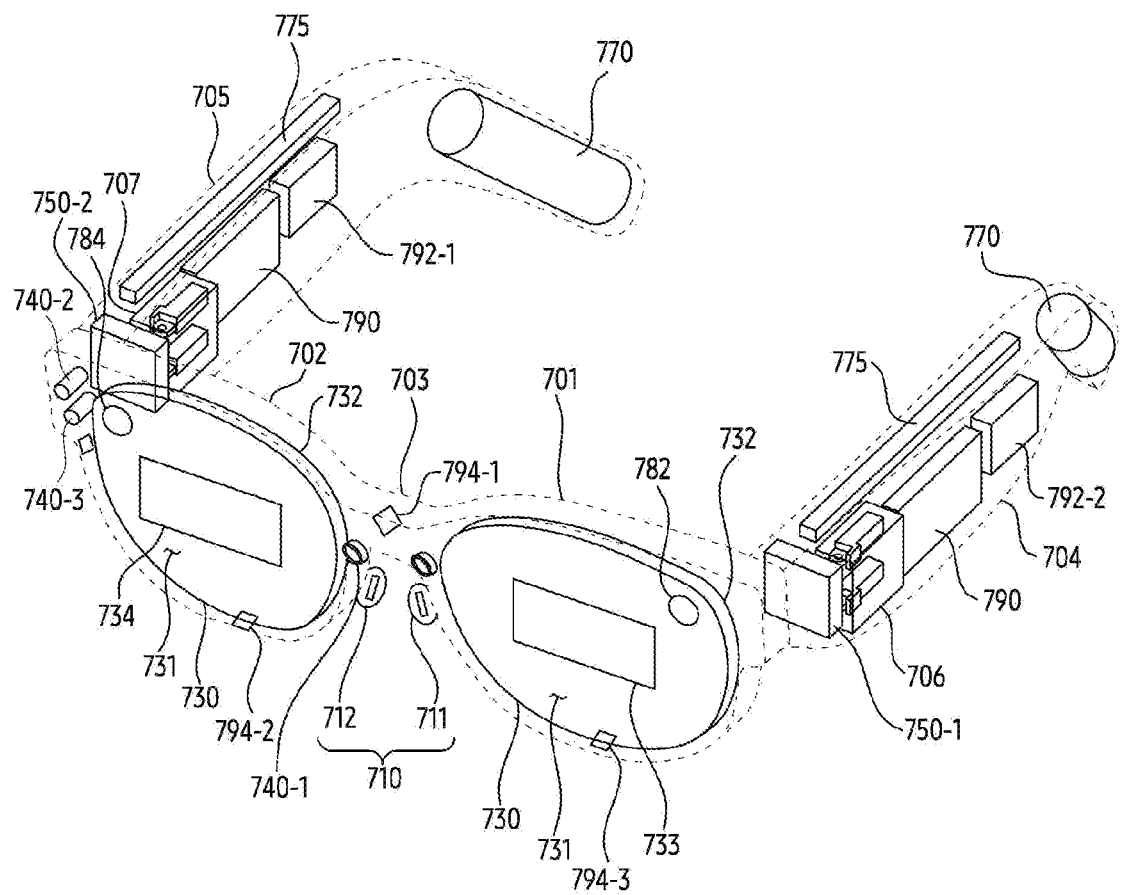
FIG. 7B is a perspective view illustrating one or more hardware components positioned in a wearable device according to an embodiment.

FIG. 7A is a perspective view illustrating a wearable device 700 according to an embodiment. FIG. 7B is a perspective view including an example of one or more hardware components disposed in a wearable device according to an embodiment. The wearable device 700 of FIGS. 7A and 7B may include the wearable device 101 of FIGS. 1, 2, 3, 4, 5A, 5B, 6A, 6B, 6C and/or FIG. 6D. As shown in FIG. 7A, according to an embodiment, the wearable device 700 may include at least one display 750 and a frame supporting the at least one display 750.

According to an embodiment, the wearable device 700 may be wearable on a portion of the user's body. The wearable device 700 may provide augmented reality (AR), virtual reality (VR), or mixed reality (MR) combining the augmented reality and the virtual reality to a user wearing the wearable device 700. For example, the wearable device 700 may output a virtual reality image to a user through the at least one display 750 in response to a user's preset gesture obtained through a motion recognition camera 740-2 of FIG. 7B.

According to an embodiment, the at least one display 750 in the wearable device 700 may provide visual information to a user. The at least one display 750 may include the display 230 of FIG. 2. For example, the at least one display 750 may include a transparent or translucent lens. The at least one display 750 may include a first display 750-1 and/or a second display 750-2 spaced apart from the first display 750-1. For example, the first display 750-1 and the second display 750-2 may be disposed at positions corresponding to the user's left and right eyes, respectively.

Referring to FIG. 7B, the at least one display 750 may provide another visual information, which is distinct from the visual information, together with the visual information included in the ambient light passing through the lens, a user wearing the wearable device 700, by forming a displaying area on the lens. The lens may be formed based on at least one of a fresnel lens, a pancake lens, or a multi-channel lens. For example, the displaying area formed by the at least one display 750 may be formed on the second surface 732 among the first surface 731 and the second surface 732 of the lens. When the user wears the wearable device 700, the ambient light may be transmitted to the user by being incident on the first surface 731 and being penetrated through the second surface 732. For another example, the at least one display 750 may display the virtual reality image to be combined with a real screen transmitted through the ambient light. The virtual reality image output from the at least one display 750 may be transmitted to the user's eyes through the one or more hardware (e.g., optical devices 782 and 784, and/or at least one waveguides 733 and 734)) included in the wearable device 700.

According to an embodiment, the wearable device 700 may include the waveguides 733 and 734 that diffracts light transmitted from the at least one display 750 and relayed by the optical devices 782 and 784 and transmits it to the user. The waveguides 733 and 734 may be formed based on at least one of glass, plastic, or polymer. A nano pattern may be formed on at least a portion of the outside or inside of the waveguides 733 and 734. The nano pattern may be formed based on a grating structure having a polygonal or curved shape. Light incident to one end of the waveguides 733 and 734 may be propagated to the other end of the waveguides 733 and 734 by the nano pattern. The waveguides 733 and 734 may include at least one of at least one diffraction element (e.g., a diffractive optical element (DOE), a holographic optical element (HOE)), and a reflection element (e.g., a reflection mirror). For example, the waveguides 733 and 734 may be disposed in the wearable device 700 to guide a screen displayed by the at least one display 750 to the user's eyes. For example, the screen may be transmitted to the user's eyes based on total internal reflection (TIR) generated in the waveguides 733 and 734.

According to an embodiment, the wearable device 700 may analyze an object included in a real image collected through a photographing camera 740-1, combine virtual object corresponding to an object that become a subject of augmented reality provision among the analyzed object, and display them on the at least one display 750. The virtual object may include at least one of text and images for various information associated with the object included in the real image. The wearable device 700 may analyze the object based on a multi-camera such as a stereo camera. For the object analysis, the wearable device 700 may execute time-of-flight (ToF) and/or simultaneous localization and mapping (SLAM) supported by the multi-camera. The user wearing the wearable device 700 may watch an image displayed on the at least one display 750.

According to an embodiment, the frame may be configured with a physical structure in which the wearable device 700 may be worn on the user's body. According to an embodiment, the frame may be configured so that when the user wears the wearable device 700, the first display 750-1 and the second display 750-2 may be positioned corresponding to the user's left and right eyes. The frame may support the at least one display 750. For example, the frame may support the first display 750-1 and the second display 750-2 to be positioned at positions corresponding to the user's left and right eyes.

Referring to FIG. 7A, according to an embodiment, the frame may include an area 720 at least partially in contact with the portion of the user's body in case that the user wears the wearable device 700. For example, the area 720 in contact with the portion of the user's body of the frame may include an area contacting a portion of the user's nose, a portion of the user's ear, and a portion of the side of the user's face that the wearable device 700 contacts. According to an embodiment, the frame may include a nose pad 710 that is contacted on the portion of the user's body. When the wearable device 700 is worn by the user, the nose pad 710 may be contacted on the portion of the user's nose. The frame may include a first temple 704 and a second temple 705 that is contacted on another portion of the user's body that is distinct from the portion of the user's body.

For example, the frame may include a first rim 701 surrounding at least a portion of the first display 750-1, a second rim 702 surrounding at least a portion of the second display 750-2, a bridge 703 disposed between the first rim 701 and the second rim 702, a first pad 711 disposed along a portion of the edge of the first rim 701 from one end of the bridge 703, a second pad 712 disposed along a portion of the edge of the second rim 702 from the other end of the bridge 703, the first temple 704 extending from the first rim 701 and fixed to a portion of the wearer's ear, and the second temple 705 extending from the second rim 702 and fixed to a portion of the ear opposite to the ear. The first pad 711 and the second pad 712 may be in contact with the portion of the user's nose, and the first temple 704 and the second temple 705 may be in contact with a portion of the user's face and the portion of the user's ear. The temples 704 and 705 may be rotatably connected to the rim through hinge units 706 and 707 of FIG. 7B. The first temple 704 may be rotatably connected with respect to the first rim 701 through the first hinge unit 706 disposed between the first rim 701 and the first temple 704. The second temple 705 may be rotatably connected with respect to the second rim 702 through the second hinge unit 707 disposed between the second rim 702 and the second temple 705. According to an embodiment, the wearable device 700 may identify an external object (e.g., a user's fingertip) touching the frame and/or a gesture performed by the external object using a touch sensor, a grip sensor, and/or a proximity sensor formed on at least a portion of the surface of the frame.

| According to an embodiment, the wearable device 700 may include hardware (e.g., hardware described above based on the block diagram of FIG. 2) that performs various functions. For example, the hardware may include a battery module 770, an antenna module 775, the optical devices 782 and 784, speakers 792-1 and 792-2, microphones 794-1, 794-2, and 794-3, a light emitting module (not illustrated), and/or a printed circuit board 790. Various hardware may be disposed in the frame.

According to an embodiment, the microphone 794-1, 794-2, and 794-3 of the wearable device 700 may obtain a sound signal, by being disposed on at least a portion of the frame. The first microphone 794-1 disposed on the nose pad 710, the second microphone 794-2 disposed on the second rim 702, and the seventh microphone 794-3 disposed on the first rim 701 are illustrated in FIG. 7B, but the number and disposition of the microphone 794 are not limited to an embodiment of FIG. 7B. In case that the number of the microphone 794 included in the wearable device 700 is two or more, the wearable device 700 may identify the direction of the sound signal using a plurality of microphones disposed on different portions of the frame.

According to an embodiment, the optical devices 782 and 784 may transmit the virtual object transmitted from the at least one display 750 to the waveguides 733 and 734. For example, the optical devices 782 and 784 may be a projector. The optical devices 782 and 784 may be disposed adjacent to the at least one display 750 or may be included in the at least one display 750 as portion of the at least one display 750. The first optical device 782 may correspond to the first display 750-1, and the second optical device 784 may correspond to the second display 750-2. The first optical device 782 may transmit the light output from the first display 750-1 to the first waveguide 733, and the second optical device 784 may transmit light output from the second display 750-2 to the second waveguide 734.

In an embodiment, a camera 740 may include an eye tracking camera (ET CAM) 740-1, the motion recognition camera 740-2, and/or the photographing camera 740-3. The photographing camera 740-3, the eye tracking camera 740-1, and the motion recognition camera 740-2 may be disposed at different positions on the frame and may perform different functions. The photographing camera 740-3, the eye tracking camera 740-1, and the motion recognition camera 740-2 may be an example of the camera 240 of FIG. 2. The eye tracking camera 740-1 may output data indicating the gaze of the user wearing the wearable device 700. For example, the wearable device 700 may detect the gaze from an image including the user's pupil obtained through the eye tracking camera 740-1. An example in which the eye tracking camera 740-1 is disposed toward the user's right eye is illustrated in FIG. 7B, but the embodiment is not limited thereto, and the eye tracking camera 740-1 may be disposed alone toward the user's left eye or may be disposed toward two eyes.

In an embodiment, the photographing camera 740-3 may photograph a real image or background to be matched with a virtual image in order to implement the augmented reality or mixed reality content. The photographing camera may photograph an image of a specific object existing at a position viewed by the user and may provide the image to the at least one display 750.

The at least one display 750 may display one image in which a virtual image provided through the optical devices 782 and 784 is overlapped with information on the real image or background including an image of the specific object obtained using the photographing camera. In an embodiment, the photographing camera may be disposed on the bridge 703 disposed between the first rim 701 and the second rim 702.

In an embodiment, the eye tracking camera 740-1 may implement a more realistic augmented reality by matching the user's gaze with the visual information provided on the at least one display 750 by tracking the gaze of the user wearing the wearable device 700. For example, when the user looks at the front, the wearable device 700 may naturally display environment information associated with the user's front on the at least one display 750 at the position where the user is positioned. The eye tracking camera 740-1 may be configured to capture an image of the user's pupil in order to determine the user's gaze. For example, the eye tracking camera 740-1 may receive gaze detection light reflected from the user's pupil and may track the user's gaze based on the position and movement of the received gaze detection light. In an embodiment, the eye tracking camera 740-1 may be disposed at a position corresponding to the user's left and right eyes. For example, the eye tracking camera 740-1 may be disposed in the first rim 701 and/or the second rim 702 to face the direction in which the user wearing the wearable device 700 is positioned.

In an embodiment, the motion recognition camera 740-2 may provide a specific event to the screen provided on the at least one display 750 by recognizing the movement of the whole or portion of the user's body, such as the user's torso, hand, or face. The motion recognition camera 740-2 may obtain a signal corresponding to the gesture by recognizing the user's gesture, and may provide a display corresponding to the signal to the at least one display 750. The processor may identify a signal corresponding to the operation and may perform a preset function based on the identification. In an embodiment, the motion recognition camera 740-2 may be disposed on the first rim 701 and/or the second rim 702.

In an embodiment, the camera 740 included in the wearable device 700 is not limited to the above-described eye tracking camera 740-1 and the motion recognition camera 740-2. For example, the wearable device 700 may identify an external object included in the FoV using the photographing camera 740-3 disposed toward the user's FoV. That the wearable device 700 identifies the external object may be performed based on a sensor for identifying a distance between the wearable device 700 and the external object, such as a depth sensor and/or a time of flight (ToF) sensor. The camera 740 disposed toward the FoV may support an autofocus function and/or an optical image stabilization (OIS) function. For example, the wearable device 700 may include the camera 740 (e.g., a face tracking (FT) camera) disposed toward the face in order to obtain an image including the face of the user wearing the wearable device 700.

Although not illustrated, the wearable device 700 according to an embodiment may further include a light source (e.g., LED) that emits light toward a subject (e.g., user's eyes, face, and/or an external object in the FoV) photographed using the camera 740. The light source may include an LED having an infrared wavelength. The light source may be disposed on at least one of the frame, and the hinge units 706 and 707.

According to an embodiment, the battery module 770 may supply power to electronic components of the wearable device 700. In an embodiment, the battery module 770 may be disposed in the first temple 704 and/or the second temple 705. For example, the battery module 770 may be a plurality of battery modules 770. The plurality of battery modules 770, respectively, may be disposed on each of the first temple 704 and the second temple 705. In an embodiment, the battery module 770 may be disposed at an end of the first temple 704 and/or the second temple 705.

In an embodiment, the antenna module 775 may transmit the signal or power to the outside of the wearable device 700 or may receive the signal or power from the outside. The antenna module 775 may be electronically and/or operably connected to a communication circuit of the wearable device 700. In an embodiment, the antenna module 775 may be disposed in the first temple 704 and/or the second temple 705. For example, the antenna module 775 may be disposed close to one surface of the first temple 704 and/or the second temple 705.

In an embodiment, the speakers 792-1 and 792-2 may output a sound signal to the outside of the wearable device 700. A sound output module may be referred to as a speaker. In an embodiment, the speakers 792-1 and 792-2 may be disposed in the first temple 704 and/or the second temple 705 in order to be disposed adjacent to the ear of the user wearing the wearable device 700. For example, the wearable device 700 may include the second speaker 792-2 disposed adjacent to the user's left ear by being disposed in the first temple 704, and the first speaker 792-1 disposed adjacent to the user's right ear by being disposed in the second temple 705.

In an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 700 to the user. For example, in case that the wearable device 700 needs charging, it may repeatedly emit red light at a preset timing. In an embodiment, the light emitting module may be disposed on the first rim 701 and/or the second rim 702.

Referring to FIG. 7B, according to an embodiment, the wearable device 700 may include the printed circuit board (PCB) 790. The PCB 790 may be included in at least one of the first temple 704 or the second temple 705. The PCB 790 may include an interposer disposed between at least two sub PCBs. On the PCB 790, one or more hardware (e.g., hardware illustrated by the blocks described above with reference to FIG. 2) included in the wearable device 700 may be disposed. The wearable device 700 may include a flexible PCB (FPCB) for interconnecting the hardware.

According to an embodiment, the wearable device 700 may include at least one of a gyro sensor, a gravity sensor, and/or an acceleration sensor for detecting the posture of the wearable device 700 and/or the posture of a body part (e.g., a head) of the user wearing the wearable device 700. Each of the gravity sensor and the acceleration sensor may measure gravity acceleration, and/or acceleration based on preset 7-dimensional axes (e.g., x-axis, y-axis, and z-axis) perpendicular to each other. The gyro sensor may measure angular velocity of each of preset 7-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 700 may identify the user's motion and/or gesture performed to execute or stop a specific function of the wearable device 700 based on the IMU.

As described above, according to an embodiment, the wearable device 700 may display a first virtual object corresponding to a user of an external electronic device, while providing a screen associated with a virtual reality service, through the display 750. The wearable device 700 may identify a distance between the first virtual object and a second virtual object corresponding to a user of the wearable device 700. The wearable device 700 may activate the cameras 740-1 and 740-2, based on that the distance between the first virtual object and the second virtual object is within a preset distance. The wearable device 700 may identify the state of the user based on at least one image obtained using the activated cameras 740-1 and 740-2. In response to identifying the state of the user, the wearable device 700 may transmit data for changing the state of the second virtual object corresponding to the user of the wearable device 700 displayed through the display of the external electronic device based on the state of the user, to the external electronic device. The wearable device 700 may enhance the user experience of the wearable device 700 and the external electronic device by transmitting data for changing the state of the second virtual object based on the at least one image.

Figure 8A:
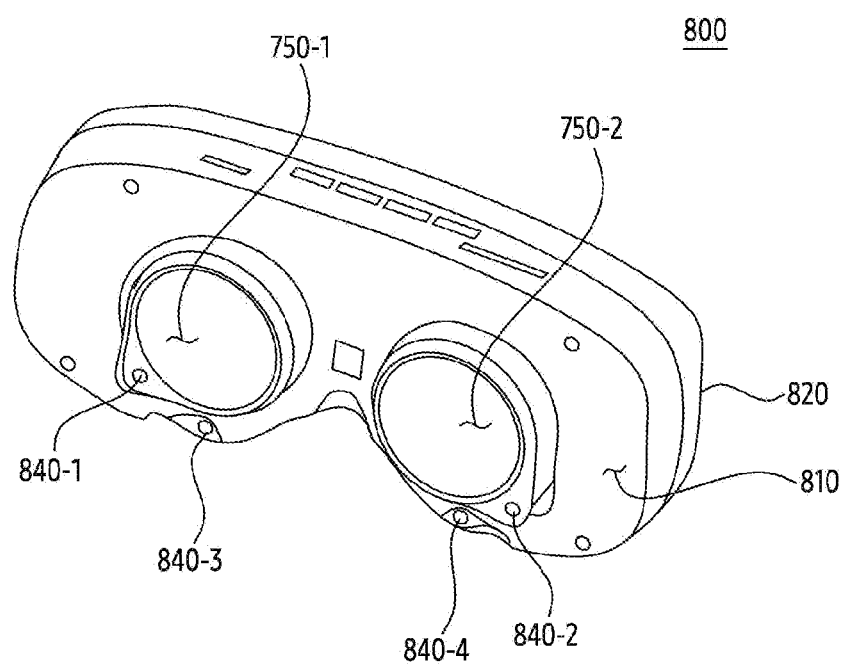
FIGS. 8A and 8B are perspective views illustrating an example of an exterior of a wearable device according to an embodiment.
Figure 8B:
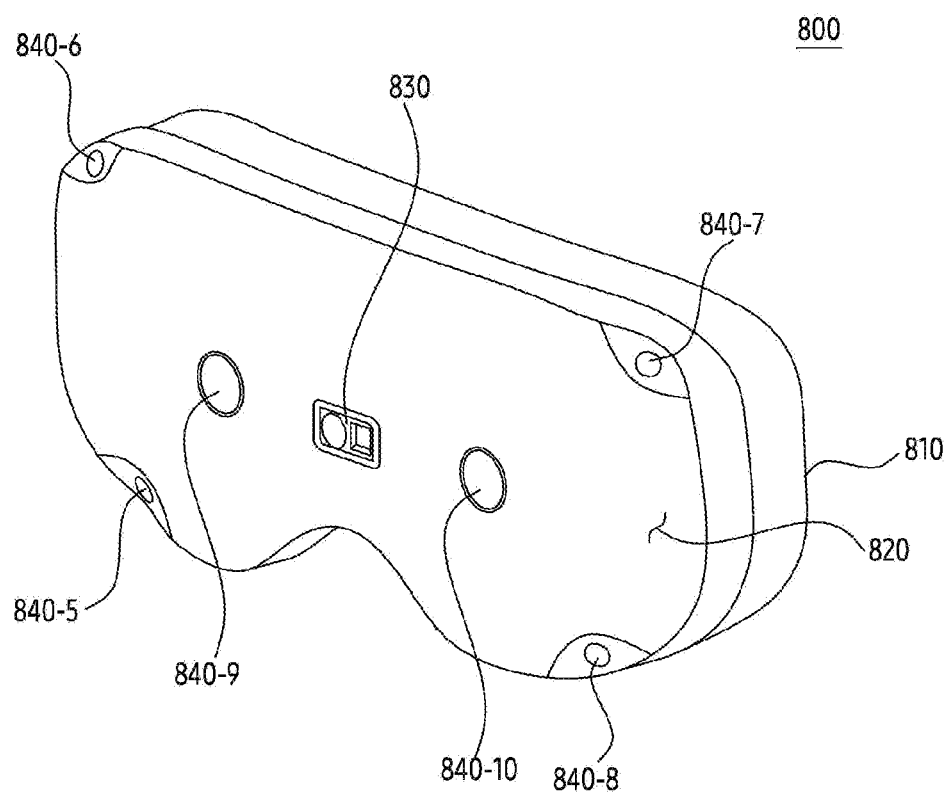

FIGS. 8A and 8B are perspective views illustrating an example of the appearance of a wearable device 800 according to an embodiment. The wearable device 800 of FIGS. 8A and 8B may include the wearable device 101 of FIGS. 1, 2, 3, 4, 5A, 5B, 6A, 6B, 6C and/or FIG. 6D. The wearable device 800 of FIGS. 8A and 8B may include the wearable device 700 of FIGS. 7A and 7B. According to an embodiment, an example of an appearance of a first surface 810 of the housing of the wearable device 800 may be illustrated in FIG. 8A, and an example of an appearance of a second surface 820 opposite to the first surface 810 may be illustrated in FIG. 8B.

Referring to FIG. 8A, according to an embodiment, the first surface 810 of the wearable device 800 may have an attachable shape on the user's body part (e.g., the user's face). Although not illustrated, the wearable device 800 may further include a strap for being fixed on the user's body part, and/or one or more temples (e.g., a first temple 704 and/or a second temple 705 of FIGS. 7A to 7B). A first display 750-1 for outputting an image to the left eye among the user's two eyes and a second display 750-2 for outputting an image to the right eye among the user's two eyes may be disposed on the first surface 810. The wearable device 800 may be formed on the first surface 810 and may further include rubber or silicon packing for preventing and/or reducing interference by light (e.g., ambient light) different from the light emitted from the first display 750-1 and the second display 750-2.

According to an embodiment, the wearable device 800 may include cameras 840-1 and 840-2 for photographing and/or tracking two eyes of the user adjacent to each of the first display 750-1 and the second display 750-2. The cameras 840-1 and 840-2 may be referred to as ET cameras. According to an embodiment, the wearable device 800 may include cameras 840-3 and 840-4 for photographing and/or recognizing the user's face. The cameras 840-3 and 840-4 may be referred to as FT cameras.

Referring to FIG. 8B, a camera (e.g., cameras 840-5, 840-6, 840-7, 840-8, 840-9, and 840-10), and/or a sensor (e.g., a depth sensor 830) for obtaining information associated with the external environment of the wearable device 800 may be disposed on the second surface 820 opposite to the first surface 810 of FIG. 8A. For example, the cameras 840-5, 840-6, 840-7, 840-8, 840-9, and 840-10 may be disposed on the second surface 820 in order to recognize an external object different from the wearable device 800. For example, using cameras 840-9, and 840-10, the wearable device 800 may obtain an image and/or video to be transmitted to each of the user's two eyes. The camera 840-9 may be disposed on the second surface 820 of the wearable device 800 to obtain an image to be displayed through the second display 750-2 corresponding to the right eye among the two eyes. The camera 840-10 may be disposed on the second surface 820 of the wearable device 800 to obtain an image to be displayed through the first display 750-1 corresponding to the left eye among the two eyes.

According to an embodiment, the wearable device 800 may include the depth sensor 830 disposed on the second surface 820 in order to identify a distance between the wearable device 800 and the external object. Using the depth sensor 830, the wearable device 800 may obtain spatial information (e.g., a depth map) about at least a portion of the FoV of the user wearing the wearable device 800.

Although not illustrated, a microphone for obtaining sound output from the external object may be disposed on the second surface 820 of the wearable device 800. The number of microphones may be one or more depending on embodiments.

Figure 9:
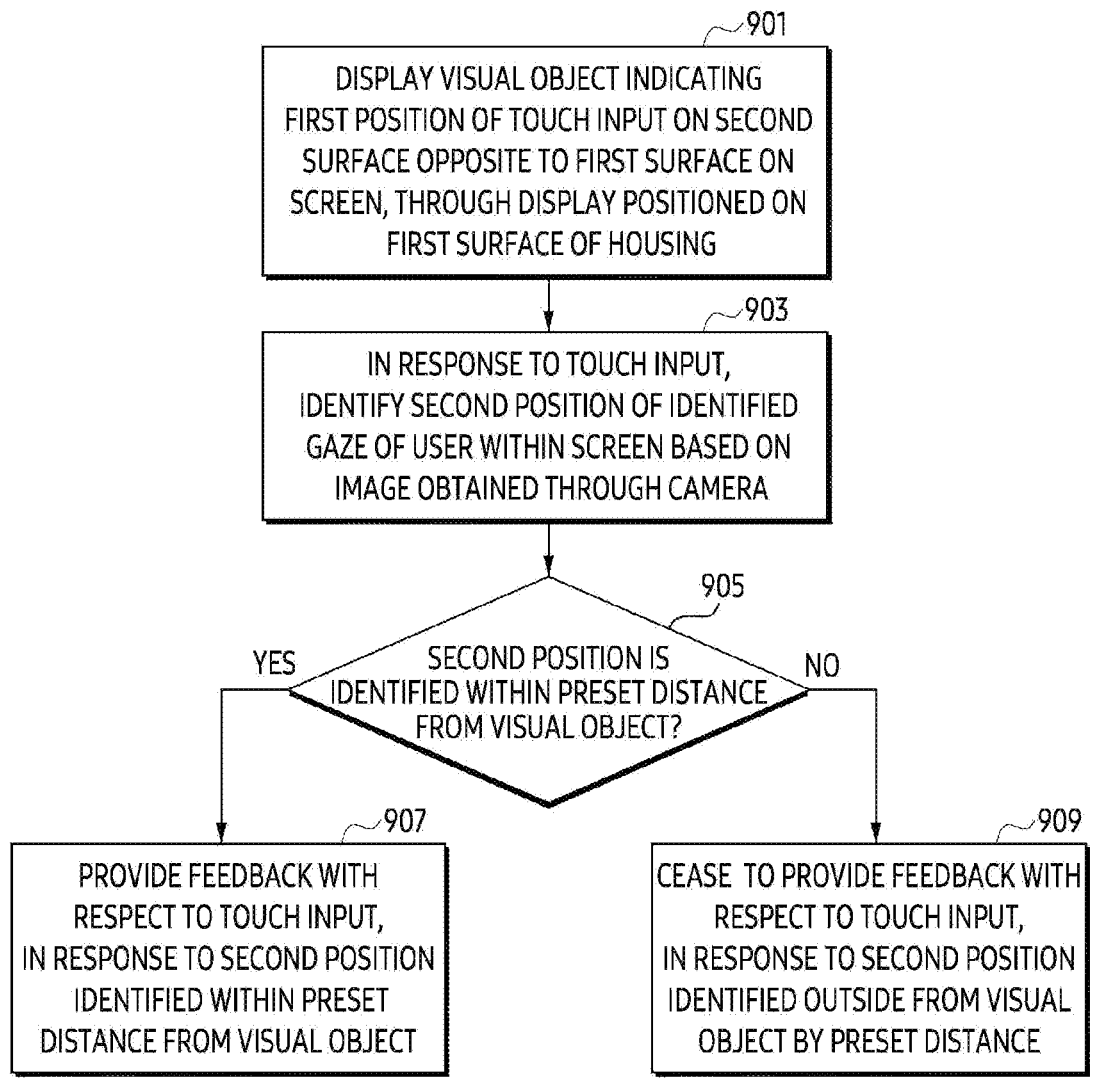
FIG. 9 is a flowchart illustrating an example operation of a wearable device, according to an embodiment.

FIG. 9 is a flowchart illustrating an example operation of a wearable device, according to an embodiment. The wearable device of FIG. 9 may include a wearable device 101 of FIGS. 1, 2, 3, 4, 5A, 5B, 6A, 6B, 6C, and/or 6D. The wearable device of FIG. 9 may include a wearable device 700 of FIGS. 7A and 7B and/or a wearable device 800 of FIGS. 8A and 8B.

Referring to FIG. 9, in operation 901, according to an embodiment, the wearable device may include a processor (e.g., a processor 210 of FIG. 2) and may include a display (e.g., a display 230 of FIG. 2) positioned on a first surface of a housing. The wearable device 101 may identify a touch input on a second surface opposite to the first surface. In responding to the touch input, the wearable device 101 may display a visual object indicating a first position of the touch input within a screen. For example, the visual object may be referred to as a pointer. The processor may display a visual object indicating the first position of the touch input on the second surface opposite to the first surface within the screen, through the display positioned on the first surface of the housing.

In operation 903, according to an embodiment, the processor of the wearable device may identify the gaze of the user, based on an image obtained through a camera (e.g., a camera 240 of FIG. 2) in response to the touch input. For example, the camera may include an eye tracking camera (e.g., an eye tracking camera 241 of FIG. 2). The processor may identify a second position of the identified gaze of the user within the screen, based on the image obtained through the camera. For example, in response to the touch input, the processor may identify the second position of the identified gaze of the user within the screen based on the image obtained through the camera.

In operation 905, according to an embodiment, the processor of the wearable device, may identify whether the second position is identified within a preset distance from the first position indicated by the visual object. For example, the processor may identify whether the second position is identified within the preset distance from the first position of the visual object, within a preset duration from timing when the first position is identified.

In case that the second position is identified within the preset distance from the visual object (905—Yes), in operation 907, according to an embodiment, the processor of the wearable device may provide feedback with respect to the touch input. For example, the processor may provide the feedback with respect to the touch input, in response to the second position identified within the preset distance from the first position of the visual object. The processor may provide the feedback with respect to the touch input, in response to the second position identified within the preset distance from the first position, within the preset duration from the timing when the first position is identified. For example, the processor may display a second visual object that is different from the visual object that is a first visual object, at the second position.

In case that the second position is identified outside from the first position of the visual object by the preset distance (905—No), in operation 909, according to an embodiment, the processor of the wearable device may cease to provide the feedback with respect to the touch input. For example, the processor may cease to provide the feedback with respect to the touch input, in response to the second position identified outside from the position of the visual object by the preset distance. For example, the processor may cease to provide the feedback with respect to the touch input, in response to the second position being identified after the preset duration from the timing when the first position is identified or being identified outside from the first position by the preset distance. The processor may at least temporarily cease to identify contact of the touch input on the second surface to provide the feedback, based on that the second position is identified after the preset duration from the timing when the first position is identified, and/or identifying the second location outside from the first position by the preset distance.

As described above, according to an embodiment, the wearable device may identify whether to provide the feedback with respect to the touch input, in response to the first position where the touch input is identified and the second position within the screen of the gaze of the user. The wearable device may provide the feedback with respect to the touch input desired by the user of the wearable device, by providing the feedback with respect to the touch input, in response to the first position and the second position.

A method for providing feedback may be required in case that a user desires a touch input on a second surface opposite to a first surface on which the display of a wearable device is positioned. As described above, according to an example embodiment, a wearable device, may comprise: a housing, at least one processor comprising processing circuitry disposed in the housing, a display positioned on a first surface of the housing, a camera a exposed outside at a portion of the first surface, a touch sensor configured to identify contact on a second surface opposite to the first surface. At least one processor may be configured to display, based on contact on the second surface identified using the touch sensor, a visual object indicating a first position of the touch input on the second surface in a screen through the display. At least one processor may be configured to identify, in response to the touch input, a second position in the screen of a gaze identified based on an image obtained through the camera. At least one processor may be configured to provide, in response to the second position identified within a specified distance from the first position of the visual object, feedback with respect to the touch input. At least one processor may be configured to at least temporarily cease to identify the contact of the second surface to provide the feedback in response to the second position identified outside from the first position by the specified distance.

According to an example embodiment, the visual object may be a first visual object. At least one processor 210 may be configured to display a second visual object in the second position within the screen of the gaze.

According to an example embodiment, at least one processor may be configured to display colors of each of the first visual object and the second visual object differently.

According to an example embodiment, at least one processor may configured to display, based on identifying an event, virtual objects in the screen. At least one processor may be configured to execute, based on a sequence of the touch input with respect to the virtual objects, a function corresponding to the event.

According to an example embodiment, the wearable device may comprise a memory. At least one processor may be configured to store information associated with the sequence of the touch input with respect to the virtual objects in the memory.

According to an example embodiment, the sequence may include a first sequence. At least one processor may be configured to cease to execute the function corresponding to the event, in response to identifying a touch input of a second sequence different from the first sequence, based on information associated with the first sequence stored in the memory.

According to an example embodiment, at least one processor may be configured to provide, based on identifying the second position in a specified duration within the specified distance from the visual object, the feedback with respect to the touch input.

According to an example embodiment, at least one processor may be configured to identify, based on identifying a touch gesture including the touch input, a first direction where the touch gesture is input. At least one processor may be configured to provide, based on a second direction where the gaze corresponding to the first direction is moved, the feedback.

As described above, according to an example embodiment, a method of a wearable device may comprise displaying, in a screen, through a display positioned on a first surface of a housing, a visual object indicating a first position of the touch input on a second surface opposite to the first surface. The method may comprise identifying, in response to the touch input, a second position in the screen of a gaze identified based on an image obtained through a camera. The method may comprise providing, in response to the second position identified within a specified distance from the first position of the visual object, feedback with respect to the touch input. The method may comprise at least temporarily ceasing to identify the contact of the second surface to provide the feedback in response to the second position identified outside from the first position by the specified distance.

According to an example embodiment, the visual object may be a first visual object. The method may comprise displaying a second visual object in the second position within the screen of the gaze.

According to an example embodiment, the method may comprise displaying colors of each of the first visual object and the second visual object differently.

According to an example embodiment, the method may comprise displaying, based on identifying an event, virtual objects in the screen. The method may comprise executing, based on a sequence of the touch input with respect to the virtual objects, a function corresponding to the event.

According to an example embodiment, the method may comprise storing information associated with the sequence of the touch input with respect to the virtual objects in a memory.

According to an example embodiment, the sequence may include a first sequence. The method may comprise ceasing to execute the function corresponding to the event, in response to identifying a touch input of a second sequence different from the first sequence, based on information associated with the first sequence stored in the memory.

According to an example embodiment, the method may comprise providing, based on identifying the second position in a specified duration within the specified distance from the visual object, the feedback with respect to the touch input.

According to an example embodiment, the method may comprise identifying, based on identifying a touch gesture including the touch input, a first direction where the touch gesture is input. The method may comprise providing, based on a second direction where the gaze corresponding to the first direction is moved, the feedback.

As described above, according to an example embodiment, a non-transitory computer-readable storage medium storing one or more programs, wherein the one or more programs, when executed by at least one processor of a wearable device, may cause the wearable device to display, in a screen, through a display positioned on a first surface of a housing, a visual object indicating a first position of the touch input on a second surface opposite to the first surface. The one or more programs, when executed by at least one processor of the wearable device, may cause the wearable device to identify, in response to the touch input, a second position in the screen of a gaze identified based on an image obtained through a camera. The one or more programs, when executed by at least one processor of the wearable device, may cause the wearable device to provide, in response to the second position identified within a specified distance from the first position of the visual object, feedback with respect to the touch input. The one or more programs, when executed by at least one processor of the wearable device 101, may cause the wearable device to at least temporarily cease to identify the contact of the second surface to provide the feedback in response to the second position identified outside from the first position by the specified distance.

According to an example embodiment, the visual object may include a first visual object. The one or more programs, when executed by at least one processor of the wearable device, may cause the wearable device to display a second visual object in the second position within the screen of the gaze of the user.

According to an example embodiment, the one or more programs, when executed by at least one processor of the wearable device, cause the wearable device to display colors of each of the first visual object and the second visual object differently.

According to an example embodiment, the one or more programs, when executed by at least one processor of the wearable device, may cause the wearable device to display, based on identifying an event, virtual objects in the screen. The one or more programs, when executed by at least one processor of the wearable device 101, may cause the wearable device to execute, based on a sequence of the touch input with respect to the virtual objects, a function corresponding to the event.

According to an example embodiment, the one or more programs, when executed by at least one processor of the wearable device 101, may cause the wearable device to store, in memory, information associated with the sequence of the touch inputs with respect to the virtual objects.

According to an example embodiment, the sequence may include a first sequence. The one or more programs, when executed by at least one processor of the wearable device, may cause the wearable device to cease to execute the function corresponding to the event, in response to identifying a touch input of a second sequence different from the first sequence, based on information associated with the first sequence stored in the memory.

According to an example embodiment, the one or more programs, when executed by at least one processor of the wearable device, may cause the wearable device to provide, based on identifying the second position in a specified duration within the specified distance from the visual object, the feedback with respect to the touch input.

According to an example embodiment, the one or more programs, when executed by at least one processor of the wearable device, may cause the wearable device to identify, based on identifying a touch gesture including the touch input, a first direction where the touch gesture is input. The one or more programs, when executed by at least one processor of the wearable device, may cause the wearable device to provide, based on a second direction where the gaze corresponding to the first direction is moved, the feedback.

The apparatus described above may be implemented as a combination of hardware components, software components, and/or hardware components and software components. For example, the devices and components described in the various example embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to an embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floptical disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the disclosure. It will also be understood that any of the embodiment(s) described herein may be used in conjunction with any other embodiment(s) described herein.

What is claimed is:

1. A head-wearable electronic device; comprising:
   memory comprising one or more storage media storing instructions;
   at least one processor comprising processing circuitry;
   a display;
   a camera positioned toward an eye of a user wearing the head-wearable electronic device; and
   a touch sensor configured to identify a contact point on a first side of the head-wearable electronic device opposite to a second side of the head-wearable electronic device defined by the display,
   wherein the instructions, when executed by the at least one processor individually or collectively, cause the head-wearable electronic device to:
   display, via the display, a user interface (UI) object;
   identify, using the touch sensor, the contact point;
   based on the contact point at a position associated with the UI object being identified, identify, using the camera, a gaze point of the eye; and
   based on the gaze point positioned within a reference distance from the identified contact point, execute a function of the UI object.

2. The head-wearable electronic device of claim 1, wherein the instructions, when executed by the at least one processor individually or collectively, cause the head-wearable electronic device
   to:
   based on the gaze point positioned away from the identified contact point according to a distance longer than the reference distance, cease to execute the function.

3. The head-wearable electronic device of claim 1, wherein the UI object is a first UI object,
   wherein the instructions, when executed by the at least one processor individually or collectively cause the head-wearable electronic device to:
   display, together with the first UI object, a second UI object.

4. The head-wearable electronic device of claim 3, wherein the instructions, when executed by the at least one processor individually or collectively, cause the head-wearable electronic device to:
   based on the contact point being dragged from the position associated with the first UI object to the second UI object, identify, using the camera, whether the gaze point is moved along a trajectory of the dragged contact point while maintaining a distance between the gaze point and the contact point shorter than the reference distance;
   based on a determination that the gaze point is moved along the trajectory while maintaining the distance shorter than the reference distance, execute the function of a sequence of the first UI object and the second UI object.

5. The head-wearable electronic device of claim 4,
wherein the instructions, when executed by the at least one pro or individually or collectively, cause the head-wearable electronic device to:
based on executing the function:
identify registration information from the memory indicating a preset sequence;
based on the preset sequence corresponding to the sequence, switch a mode of the head-wearable electronic device from a lock mode to an unlock mode.

6. The head-wearable electronic device of claim 5, wherein the instructions, when executed by the at least one processor individually or collectively, cause the head-wearable electronic device
to:
based on the preset sequence different from the sequence, maintain the mode of the head-wearable electronic device as the lock mode.

7. The head-wearable electronic device of claim 1, wherein the instructions, when executed by the at least one processor individually or collectively, cause the head-wearable electronic devices to:
based on the gaze point positioned within the reference distance from the identified contact point, execute the function by processing the identification of the contact point as identification of a user input associated with the UI object.

8. The head-wearable electronic device of claim 1, wherein the instructions, when executed by the at least one processor individually or collectively, cause the head-wearable electronic device to:
based on the contact point being identified, display a visual object;
based on the contact point being dragged from the position to another position, change a position of the visual object to represent a trajectory of the dragged contact point.

9. A method of a head-wearable electronic device comprising a display, a camera positioned toward an eye of a user wearing the head-wearable electronic device, and a touch sensor configured to identify a contact point on a first side of the head-wearable electronic device opposite to a second side of the head-wearable electronic device defined by the display, comprising:
displaying, via the display, a user interface (UI) object;
identifying, using the touch sensor, the contact point;
based on the contact point at a position associated with the UI object being identified, identifying, using the camera, a gaze point of the eye; and
based on the gaze point positioned within a reference distance from the identified contact point, executing a function of the UI object.

10. The head-wearable electronic device of claim 8, wherein the visual object is a first visual object,
wherein the instructions, when executed by the at least one processor individually or collectively, cause the head-wearable electronic device to:
based on the gaze point being identified, display a second visual object;
based on identifying a movement of the gaze point, change a position of the second visual object to represent the movement of the gaze point.

11. The method of claim 9, further comprising:
based on the gaze point positioned away from the identified contact point according to a distance longer than the reference distance, ceasing to execute the function.

12. The method of claim 9, wherein the UI object is a first UL object and the displaying further comprises:
displaying, together with the first UI object, a second UI object.

13. The method of claim 12, further comprising:
based on the contact point being dragged from the position associated with the first UI object to the second UI object, identifying, using the camera, whether the gaze point is moved along a trajectory of the dragged contact point while maintaining a distance between the gaze point and the contact point shorter than the reference distance;
based on determination that the gaze point is moved along the trajectory while maintaining the distance shorter than the reference distance, executing the function of a sequence of the first UI object and the second UL object.

14. The method of claim 13, wherein the executing further comprises:
identifying registration information from memory indicating a preset sequence;
based on the preset sequence corresponding to the sequence, switching a mode of the head-wearable electronic device from a lock mode to an unlock mode.

15. The method of claim 14, wherein the executing further comprises:
based on the preset sequence different from the sequence, maintaining the mode of the head-wearable electronic device as the lock mode.

16. The method of claim 9, wherein the executing further comprising:
based on the gaze point positioned within the reference distance from the identified contact point, executing the function by processing the identification of the contact point as identification of a user input associated with the UI object.

17. A non-transitory computer-readable storage medium storing one or more programs, wherein the one or more programs, when executed by a head-wearable electronic device comprising a display, a camera positioned toward an eye of a user wearing the head-wearable electronic device, and a touch sensor configured to identify a contact point on a first side of the head-wearable electronic device opposite to a second side of the head-wearable electronic device defined by the display, cause the head-wearable electronic device to:
display, via the display, a first user interface (UI) object and a second UI object;
identify, using the touch sensor, the contact point, and identify, using the camera, the gaze point of the eye;
based on identification of the contact point being dragged from a first position associated with the first UI object to a second position associated with the second UI object, identify whether the gaze point is moved alongside the contact point within a reference distance:
based on identifying that the gaze point is moved alongside the contact point within a reference distance, execute a function associated with a user input indicating a sequential selection of the first UI object and the second UI object.

18. The non-transitory computer-readable storage medium of claim 17, wherein the one or more programs, when executed by the head-wearable electronic devices, cause the head-wearable electronic device to:
based on executing the function:
  identify sequence information for unlock the head-wearable electronic device:
  identify the sequence information indicating a sequence corresponding to the sequential selection, switch a mode of the head-wearable electronic device from a lock mode to an unlock mode.

19. The non-transitory computer-readable storage medium of claim 18, wherein the one or more programs, when executed by the head-wearable electronic device, cause the head-wearable electronic device to:
  identify the sequence information indicating another sequence different from the sequential selection, maintain the mode of the head-wearable electronic device as the lock mode.

20. The non-transitory computer-readable storage medium of claim 17, wherein the one or more programs, when executed by the head-wearable electronic device, cause the head-wearable electronic device to:
  based on identifying the contact point, display a third visual object with a first color; and
  based on identifying the gaze point, display a fourth visual object with a second color.

* * * * *